United States Patent
Poh et al.

(10) Patent No.: US 12,315,294 B1
(45) Date of Patent: May 27, 2025

(54) INTEROPERABLE BIOMETRIC REPRESENTATION

(71) Applicant: T Stamp Inc., Atlanta, GA (US)

(72) Inventors: Norman Hoon Thian Poh, Atlanta, GA (US); Ramprakash Srinivasan Puri, Atlanta, GA (US); Luke Arpino, Atlanta, GA (US); Daryl Burns, Atlanta, GA (US)

(73) Assignee: T Stamp Inc., Atlanta, GA (US)

( * ) Notice: Subject to any disclaimer, the term of this patent is extended or adjusted under 35 U.S.C. 154(b) by 472 days.

(21) Appl. No.: 17/725,978

(22) Filed: Apr. 21, 2022

Related U.S. Application Data

(60) Provisional application No. 63/177,494, filed on Apr. 21, 2021.

(51) Int. Cl.
| | |
|---|---|
| *G06V 40/16* | (2022.01) |
| *G06N 3/08* | (2023.01) |
| *G06V 40/12* | (2022.01) |
| *G06V 40/18* | (2022.01) |

(52) U.S. Cl.
CPC ............ *G06V 40/168* (2022.01); *G06N 3/08* (2013.01); *G06V 40/1347* (2022.01); *G06V 40/193* (2022.01)

(58) Field of Classification Search
CPC . G06V 40/168; G06V 40/1347; G06V 40/193
See application file for complete search history.

(56) References Cited

U.S. PATENT DOCUMENTS

| | | |
|---|---|---|
| 6,836,554 B1 | 12/2004 | Bolle et al. |
| 7,120,607 B2 | 10/2006 | Bolle et al. |
| 7,412,081 B2 | 8/2008 | Doi |
| 7,773,784 B2 | 8/2010 | Boult |
| 7,822,631 B1 | 10/2010 | Vander Mey et al. |

(Continued)

FOREIGN PATENT DOCUMENTS

| | | |
|---|---|---|
| CN | 103930921 A | 7/2014 |
| EP | 3065366 A1 | 9/2016 |

(Continued)

OTHER PUBLICATIONS

Rathgeb et al., "Unlinkable Improved Multi-biometric Iris Fuzzy Vault", EURASIP Journal on Information Security, 2016, 2016:26.

(Continued)

*Primary Examiner* — Diane D Mizrahi
(74) *Attorney, Agent, or Firm* — Bradley Arant Boult Cummings LLP; Daniel E. Sineway, Esq.

(57) ABSTRACT

A process for interoperable biometric representation can include receiving a biometric representation in a first format. The process can include determining a dimension parameter based on the biometric representation, wherein the dimension parameter does not exceed a dimension of the biometric representation. The process can include generating a common biometric representation in a second format by applying a feature-to-feature mapping function to the biometric representation, wherein a vector dimension of the common biometric representation equals the dimension parameter. The process can include applying a lossy transformation to the common biometric representation to generate a token.

18 Claims, 13 Drawing Sheets

(56) References Cited

U.S. PATENT DOCUMENTS

| | | |
|---|---|---|
| 8,010,460 B2 | 8/2011 | Work et al. |
| 8,249,314 B2 | 8/2012 | Bolle et al. |
| 8,312,291 B2 | 11/2012 | Golic et al. |
| 8,316,086 B2 | 11/2012 | Ufford et al. |
| 8,457,367 B1 | 6/2013 | Sipe et al. |
| 8,510,797 B2 | 8/2013 | Kasturi |
| 8,542,879 B1 | 9/2013 | Nechyba et al. |
| 8,675,926 B2 | 3/2014 | Zhang et al. |
| 8,724,856 B1 | 5/2014 | King |
| 8,965,066 B1 | 2/2015 | Derakhshani et al. |
| 9,070,088 B1 | 6/2015 | Baveja et al. |
| 9,147,117 B1 | 9/2015 | Madhu et al. |
| 9,173,101 B1 | 10/2015 | Angelov et al. |
| 9,262,725 B2 | 2/2016 | Butte et al. |
| 9,300,676 B2 | 3/2016 | Madhu et al. |
| 9,477,828 B2 | 10/2016 | Irie |
| 9,495,588 B2 | 11/2016 | Derakhshani et al. |
| 9,521,606 B1 | 12/2016 | Costa et al. |
| 9,652,663 B2 | 5/2017 | Lau et al. |
| 9,679,212 B2 | 6/2017 | Kim et al. |
| 9,721,147 B1 | 8/2017 | Kapczynski |
| 9,838,388 B2 | 12/2017 | Mather et al. |
| 9,866,393 B1 | 1/2018 | Rush et al. |
| 10,019,561 B1 | 7/2018 | Shelton et al. |
| 10,049,287 B2 | 8/2018 | Holz et al. |
| 10,210,388 B2 | 2/2019 | Derakhshani et al. |
| 10,225,255 B1 | 3/2019 | Jampani et al. |
| 10,275,684 B2 | 4/2019 | Han et al. |
| 10,320,569 B1 | 6/2019 | Wentz et al. |
| 10,430,638 B2 | 10/2019 | Russo |
| 10,594,688 B2 | 3/2020 | Yang et al. |
| 10,628,700 B2 | 4/2020 | Puri et al. |
| 10,635,894 B1 | 4/2020 | Genner |
| 10,650,226 B2 | 5/2020 | Chu et al. |
| 10,733,424 B2 | 8/2020 | Son et al. |
| 10,735,205 B1 | 8/2020 | Wentz et al. |
| 10,796,178 B2 | 10/2020 | Fan et al. |
| 10,810,423 B2 | 10/2020 | Thavalengal |
| 11,080,516 B1 | 8/2021 | Joshi et al. |
| 11,080,517 B2 | 8/2021 | Wu et al. |
| 11,093,771 B1 | 8/2021 | Genner |
| 11,095,631 B1 | 8/2021 | Genner |
| 11,151,468 B1 | 10/2021 | Chen et al. |
| 11,301,586 B1 | 4/2022 | Poh et al. |
| 11,496,315 B1 | 11/2022 | Genner et al. |
| 2004/0019570 A1 | 1/2004 | Bolle et al. |
| 2004/0096085 A1 | 5/2004 | Matsumoto et al. |
| 2004/0186906 A1 | 9/2004 | Torrant et al. |
| 2005/0235148 A1 | 10/2005 | Scheidt et al. |
| 2006/0015358 A1 | 1/2006 | Chua |
| 2006/0042483 A1 | 3/2006 | Work et al. |
| 2006/0114520 A1 | 6/2006 | Enomoto et al. |
| 2006/0212931 A1 | 9/2006 | Shull et al. |
| 2007/0174633 A1 | 7/2007 | Draper et al. |
| 2008/0310727 A1 | 12/2008 | Wu et al. |
| 2008/0313714 A1 | 12/2008 | Fetterman et al. |
| 2009/0022374 A1 | 1/2009 | Boult |
| 2009/0080717 A1 | 3/2009 | Dias |
| 2009/0210722 A1 | 8/2009 | Russo |
| 2009/0271634 A1 | 10/2009 | Boult et al. |
| 2009/0310830 A1 | 12/2009 | Bolle et al. |
| 2009/0327054 A1 | 12/2009 | Yao et al. |
| 2010/0017618 A1 | 1/2010 | Golic et al. |
| 2010/0194919 A1 | 8/2010 | Ishii et al. |
| 2010/0250676 A1 | 9/2010 | Ufford et al. |
| 2011/0099277 A1 | 4/2011 | Yao et al. |
| 2011/0131643 A1 | 6/2011 | Lawrence et al. |
| 2011/0137789 A1 | 6/2011 | Kortina et al. |
| 2011/0246766 A1 | 10/2011 | Orsini et al. |
| 2011/0285748 A1 | 11/2011 | Slatter et al. |
| 2012/0011066 A1 | 1/2012 | Telle et al. |
| 2012/0014507 A1 | 1/2012 | Wu et al. |
| 2012/0072384 A1 | 3/2012 | Schreiner et al. |
| 2012/0102332 A1 | 4/2012 | Mullin |
| 2012/0124651 A1 | 5/2012 | Ganesan et al. |
| 2012/0130863 A1 | 5/2012 | Tedjamulia et al. |
| 2012/0284786 A1 | 11/2012 | Somani et al. |
| 2012/0331567 A1 | 12/2012 | Shelton |
| 2013/0004033 A1 | 1/2013 | Trugenberger |
| 2013/0086641 A1 | 4/2013 | Mehr et al. |
| 2013/0104202 A1 | 4/2013 | Yin et al. |
| 2013/0124644 A1 | 5/2013 | Hunt et al. |
| 2013/0191898 A1 | 7/2013 | Kraft |
| 2013/0219479 A1 | 8/2013 | DeSoto et al. |
| 2013/0259228 A1 | 10/2013 | Ren et al. |
| 2013/0262873 A1 | 10/2013 | Read et al. |
| 2014/0013422 A1 | 1/2014 | Janus et al. |
| 2014/0020073 A1 | 1/2014 | Ronda et al. |
| 2014/0037074 A1 | 2/2014 | Bravo et al. |
| 2014/0037156 A1 | 2/2014 | Cavallini |
| 2014/0059660 A1 | 2/2014 | Marra et al. |
| 2014/0071131 A1 | 3/2014 | Kitago |
| 2014/0075513 A1 | 3/2014 | Trammel et al. |
| 2014/0090039 A1 | 3/2014 | Bhow |
| 2014/0101434 A1 | 4/2014 | Senthurpandi et al. |
| 2014/0129493 A1 | 5/2014 | Leopold |
| 2014/0164218 A1 | 6/2014 | Stewart |
| 2014/0230023 A1 | 8/2014 | Parks |
| 2014/0247985 A1 | 9/2014 | Park |
| 2014/0253707 A1 | 9/2014 | Gangadhar |
| 2014/0258305 A1 | 9/2014 | Kapadia et al. |
| 2014/0270404 A1 | 9/2014 | Hanna et al. |
| 2014/0273978 A1 | 9/2014 | Van Snellenberg |
| 2014/0279556 A1 | 9/2014 | Priebatsch et al. |
| 2014/0289833 A1 | 9/2014 | Briceno et al. |
| 2014/0330732 A1 | 11/2014 | Grignon |
| 2014/0333415 A1 | 11/2014 | Kursun |
| 2014/0337948 A1 | 11/2014 | Hoyos |
| 2015/0046327 A1 | 2/2015 | Taupitz |
| 2015/0059003 A1 | 2/2015 | Bouse |
| 2015/0078630 A1 | 3/2015 | Derakhshani et al. |
| 2015/0121456 A1 | 4/2015 | Milman et al. |
| 2015/0154436 A1 | 6/2015 | Shi et al. |
| 2015/0156031 A1 | 6/2015 | Fadell et al. |
| 2015/0180857 A1 | 6/2015 | Schulman et al. |
| 2015/0186721 A1 | 7/2015 | Derakhshani et al. |
| 2015/0205800 A1 | 7/2015 | Work et al. |
| 2015/0227890 A1 | 8/2015 | Bednarek et al. |
| 2015/0261999 A1 | 9/2015 | Thiebot et al. |
| 2015/0269394 A1 | 9/2015 | Bringer et al. |
| 2015/0332169 A1 | 11/2015 | Bivens et al. |
| 2016/0019614 A1 | 1/2016 | Dziuk |
| 2016/0034708 A1 | 2/2016 | Shim et al. |
| 2016/0037156 A1 | 2/2016 | Lee |
| 2016/0048837 A1 | 2/2016 | Jin et al. |
| 2016/0050199 A1 | 2/2016 | Ganesan |
| 2016/0070704 A1 | 3/2016 | Yu |
| 2016/0085958 A1 | 3/2016 | Kang |
| 2016/0088023 A1 | 3/2016 | Handa et al. |
| 2016/0132901 A1 | 5/2016 | Davar et al. |
| 2016/0173605 A1 | 6/2016 | Iasi et al. |
| 2016/0191513 A1 | 6/2016 | Tomlinson et al. |
| 2016/0224853 A1 | 8/2016 | Xiong |
| 2016/0269178 A1 | 9/2016 | Yang et al. |
| 2016/0277424 A1 | 9/2016 | Mawji et al. |
| 2016/0379182 A1 | 12/2016 | Sheng et al. |
| 2017/0006008 A1 | 1/2017 | Moran et al. |
| 2017/0019400 A1 | 1/2017 | Drolshagen et al. |
| 2017/0032485 A1 | 2/2017 | Vemury |
| 2017/0034183 A1 | 2/2017 | Enqvist et al. |
| 2017/0061138 A1 | 3/2017 | Lambert |
| 2017/0082740 A1 | 3/2017 | Kitchens, II et al. |
| 2017/0134366 A1 | 5/2017 | Genner et al. |
| 2017/0140204 A1 | 5/2017 | Derakhshani et al. |
| 2017/0210525 A1 | 7/2017 | Mayer et al. |
| 2017/0250796 A1 | 8/2017 | Samid |
| 2017/0256056 A1 | 9/2017 | Jain et al. |
| 2017/0264599 A1 | 9/2017 | O'Regan et al. |
| 2017/0279795 A1 | 9/2017 | Redberg |
| 2017/0286788 A1 | 10/2017 | Fan et al. |
| 2017/0331818 A1 | 11/2017 | Kader et al. |
| 2017/0346851 A1 | 11/2017 | Drake |
| 2017/0372055 A1 | 12/2017 | Robinson et al. |
| 2018/0005019 A1 | 1/2018 | Chattopadhyay et al. |

(56) References Cited

U.S. PATENT DOCUMENTS

| | | |
|---|---|---|
| 2018/0018651 A1 | 1/2018 | Nelson et al. |
| 2018/0034852 A1 | 2/2018 | Goldenberg |
| 2018/0048472 A1 | 2/2018 | Pirrwitz et al. |
| 2018/0060648 A1 | 3/2018 | Yoo et al. |
| 2018/0069703 A1 | 3/2018 | Chakraborty et al. |
| 2018/0077571 A1 | 3/2018 | Mannopantar et al. |
| 2018/0082455 A1 | 3/2018 | Yamaji et al. |
| 2018/0097806 A1 | 4/2018 | Blinn |
| 2018/0101742 A1 | 4/2018 | Burge et al. |
| 2018/0167388 A1 | 6/2018 | Farrell et al. |
| 2018/0191501 A1 | 7/2018 | Lindemann |
| 2018/0205557 A1 | 7/2018 | Sun |
| 2018/0211092 A9 | 7/2018 | Derakhshani et al. |
| 2018/0248699 A1 | 8/2018 | Andrade |
| 2018/0302406 A1 | 10/2018 | Burckhardt et al. |
| 2018/0307895 A1 | 10/2018 | Chu et al. |
| 2019/0043148 A1 | 2/2019 | Vemury |
| 2019/0311102 A1 | 10/2019 | Tussy |
| 2019/0312734 A1 | 10/2019 | Wentz et al. |
| 2019/0334884 A1 | 10/2019 | Ross et al. |
| 2019/0379541 A1 | 12/2019 | Schwach et al. |
| 2020/0036707 A1 | 1/2020 | Callahan et al. |
| 2020/0084191 A1 | 3/2020 | Nicholls |
| 2020/0145219 A1 | 5/2020 | Sebastian et al. |
| 2020/0153624 A1 | 5/2020 | Wentz et al. |
| 2020/0186350 A1 | 6/2020 | Wentz et al. |
| 2020/0201679 A1 | 6/2020 | Wentz |
| 2020/0257889 A1 | 8/2020 | Merkel et al. |
| 2020/0293640 A1 | 9/2020 | Joshi et al. |
| 2020/0351089 A1 | 11/2020 | Wentz |
| 2020/0351098 A1 | 11/2020 | Wentz |
| 2020/0351657 A1 | 11/2020 | Wentz |
| 2020/0356085 A1 | 11/2020 | Wentz et al. |
| 2020/0404019 A1 | 12/2020 | Drake |
| 2021/0019519 A1 | 1/2021 | Martin et al. |
| 2021/0027080 A1 | 1/2021 | Storm et al. |
| 2021/0073518 A1 | 3/2021 | Kumar et al. |
| 2021/0160522 A1* | 5/2021 | Lee ............... H04N 19/176 |

FOREIGN PATENT DOCUMENTS

| | | |
|---|---|---|
| WO | 2008010773 A1 | 1/2008 |
| WO | 2019034589 A1 | 2/2019 |

OTHER PUBLICATIONS

Wonjun Kim, Face Liveness Detection From a Single Image via Diffusion Speed Model, IEEE Transactions on Image Processing, vol. 24, No. 8, Apr. 13, 2015, pp. 2456 to 2465.

Xinting Gao, Single-View Recaptured Image Detection Based on Physics-Based Features, 2010 IEEE International Conference on Multimedia and Expo, Jul. 19, 2010, pp. 1469 to 1474.

Di Wen, Face Spoof Detection with Image Distortion Analysis, IEEE Transactions on Information Forensics and Security, vol. 10, No. 4, Apr. 2015, pp. 746 to 761.

Rohit Kumar Pandey, Deep Secure Encoding for Face Template Protection, Conference on Computer Vision and Pattern Recognition Workshops, Jun. 26, 2016, pp. 77 to 83.

* cited by examiner

INTEROPERABLE BIOMETRIC REPRESENTATION

CROSS REFERENCE TO RELATED APPLICATIONS

This application claims priority to and the benefit of U.S. Application 63/177,494, filed Apr. 21, 2021, entitled "INTEROPERABLE BIOMETRIC REPRESENTATION," the disclosure of which is incorporated herein by reference in its entirety.

TECHNICAL FIELD

The present systems and processes relate generally to generating interoperable representations of biometric data, such as facial, palm, or iris images.

BACKGROUND

Biometric-based identification and verification has witnessed widespread adoption, and the increased implementation of biometrics has resulted in an increase in the quantity and diversity of biometric systems. As such, there now exists a multitude of biometric representation formats; however, biometric representation formats are typically restricted to a particular biometric system and thus biometric interoperability is infeasible between most biometric systems. For example, assume a first vendor represents facial biometrics as a 512-byte vector and a second vendor represents facial biometrics as a 128-byte vector. In this example, due to their dissimilar formats, biometric representations of the first vendor and second vendor cannot be compared for purposes of biometric validation or identification.

Therefore, there is a long-felt but unmet need for interoperable biometric representations and processes for making and using the same.

BRIEF SUMMARY OF THE DISCLOSURE

Briefly described, and according to one embodiment, aspects of the present disclosure generally relate to systems and processes for interoperable biometric representation.

In various embodiments, the disclosed systems provide for interoperable biometric representations that also preserve privacy of the represented subjects. One or more embodiments of the present systems convert biometric representations of disparate formats to a common, privacy-secured format and, thereby, enable cross-platform biometric recognition and validation processes. For example, embodiments of the system may compare and matches a first vendor's biometric templates to a second vendor's biometric templates, regardless of whether the first vendor and second vendor generate biometric templates of dissimilar size or other characteristics.

Generating biometric representations that are both privacy-secured and interoperable presents various technical challenges. For example, biometric fingerprint representations in a fingerprint ISO standard can be interoperable; however, most vendors choose to transform biometric representations from the ISO standard to a proprietary format that increases privacy and security of the biometric representations. Vendors typically do not disclose proprietary techniques for transforming biometric representations and, therefore, the use of biometric representations generated thereby is restricted to systems associated with that specific vendor. In other words, while ISO standards provide an initial format by which biometric interoperability can be achieved, such standards do not adequately promote privacy and security and thus transformation to secondary, non-interoperable formats is commonplace. In some instances, such as in the case of facial biometrics, there is no agreed upon ISO format or other standard for biometric representation and thus transformation of such representations to an interoperable format can be further complicated due to lack of a common basis for capturing biometric data.

For the facial biometrics, interoperability is even harder to achieve because, among other reasons, there is no agreed ISO template or data format for the facial biometrics except storing raw face images. The latter approach is of course not ideal since it reveals the subject's identity.

In various embodiments, the present systems and processes generate feature-to-feature mapping functions for transforming biometric representations from a first format of a first length to a second format of a second length less than the first length. In one or more embodiments, the present systems and processes generate and train machine learning models (e.g., deep neural networks (DNN) or other suitable machine learning models) for translating biometric representations from a first format to a second format. For example, the present system can train a first deep neural network (e.g., an artificial neural network (ANN) including multiple layers between input and output layers) to transform biometric representations from a first vendor's 128-dimension vector format to a 64-dimension vector format. Continuing the example, the system can train a second deep neural network to transform biometric representations from a second vendor's 640-dimension vector format to the 64-dimension vector format. In this example, by generating and training machine learning models for transforming dissimilarly-formatted biometric representations to a common format, the system can perform cross-vendor 1:1 and 1:N matching for biometric verification and identification.

According to a first aspect, a process, comprising: A) receiving a biometric representation in a first format; B) determining a dimension parameter based on the biometric representation, wherein the dimension parameter does not exceed a dimension of the biometric representation; C) generating a common biometric representation in a second format by applying a feature-to-feature mapping function to the biometric representation, wherein the feature-to-feature mapping function is based on the dimension parameter; and D) applying a lossy transformation to the common biometric representation to generate a token.

According to a further aspect, the process of the first aspect or any other aspect, wherein a vector dimension of the token is less than the dimension parameter.

According to a further aspect, the process of the first aspect or any other aspect, wherein a vector dimension of the token is less than the dimension parameter.

According to a further aspect, the process of the first aspect or any other aspect, wherein the feature-to-feature mapping function comprises a machine learning model.

According to a further aspect, the process of the first aspect or any other aspect, wherein the machine learning model is a deep neural network.

According to a further aspect, the process of the first aspect or any other aspect, further comprising training the deep neural network on a training dataset comprising a plurality of mated and non-mated biometric images associated with a plurality of human subjects.

According to a further aspect, the process of the first aspect or any other aspect, further comprising: A) generating a training dataset comprising a plurality of mated and non-mated synthetic biometric images, wherein the training dataset excludes biometric data associated with real human subjects; and B) training the deep neural network on the training dataset.

According to a further aspect, the process of the first aspect or any other aspect, wherein sets of mated biometric images of the training dataset each comprise at least one biometric image associated with an optimal condition and at least one biometric image associated with a non-optimal condition.

According to a further aspect, the process of the first aspect or any other aspect, wherein the non-optimal condition is an underlit lighting condition.

According to a further aspect, the process of the first aspect or any other aspect, wherein the non-optimal condition is an adverse backlight condition.

According to a further aspect, the process of the first aspect or any other aspect, wherein the non-optimal condition is an overlit lighting condition.

According to a further aspect, the process of the first aspect or any other aspect, wherein the non-optimal condition is a rotation condition.

According to a further aspect, the process of the first aspect or any other aspect, wherein: A) the plurality of mated and non-mated synthetic biometric images comprise facial images; B) the optimal condition is a first facial expression; and C) the non-optimal condition is a second facial expression different from the first facial expression.

According to a second aspect, a system, comprising: A) at least one processor in communication with at least one data store; B) the at least one data store comprising: 1) a feature-to-feature mapping function that, when applied, transforms biometric representations from a first format to a common format; and 2) a dimensionality reduction function that, when applied, reduces a dimension of biometric representations in the common format to a dimension parameter; C) a non-transitory, machine-readable memory device comprising instructions stored thereon that, when executed by the at least one processor, cause the at least one processor to: 1) obtain a first biometric representation in the first format; 2) obtain a second biometric representation in the common format, wherein the first biometric representation is associated with a first subject and the second biometric representation is associated with a second subject; 3) determine the dimension parameter for the common format based on the first biometric representation and the second biometric representation, wherein the dimension parameter does not exceed a vector size of the first biometric representation or the second biometric representation; 4) apply the feature-to-feature mapping function to the first biometric representation to generate a first common representation; 5) apply the dimensionality reduction function to the second biometric representation to generate a second common representation, wherein the first common biometric representation and the second common biometric representation are of a second vector size equal to the dimension parameter; 6) compare the first common representation to the second common representation; 7) based on the comparison, determine that the first common representation is within a similarity threshold of the second common representation; and 8) transmit, to a computing device, a positive verification of a match between the first subject and the second subject.

According to a further aspect, the system of the second aspect or any other aspect, wherein: A) the feature-to-feature mapping function comprises a deep neural network; and B) the instructions, when executed by the at least one processor, further cause the at least one processor to train the deep neural network on a first training dataset comprising a plurality of mated and non-mated biometric representations associated with human subjects.

According to a further aspect, the system of the second aspect or any other aspect, wherein the instructions, when executed by the at least one processor, further cause the at least one processor to: A) generate a second training dataset comprising a plurality of mated and non-mated synthetic biometric representations; and B) train the deep neural network on the second training dataset.

According to a further aspect, the process of the second aspect or any other aspect, wherein the instructions, when executed by the at least one processor, further cause the at least one processor to: A) generate a third training dataset comprising at least a portion of the first training dataset and the second training dataset; and B) train the deep neural network on the third training dataset.

According to a third aspect, a non-transitory, computer-readable medium comprising instructions that, when executed by a computer, cause the computer to: A) obtain a first common biometric representation of a first length and in a first format; B) obtain a second biometric representation of a second length and in a second format, wherein the first length exceeds the second length; C) apply a feature-to-feature mapping function to the second biometric representation to transform the second biometric transformation into a second common biometric representation in the first format, wherein the second common biometric representation comprises a third length less than the first length and the second length; and D) apply a dimensionality reduction function to the first common biometric representation to reduce the first common biometric representation from the first length to the third length.

According to a further aspect, the non-transitory, computer-readable medium of the third aspect or any other aspect, wherein the instructions, when executed by the computer, cause the computer to apply a lossy transformation to each of the first common biometric representation and the second common biometric representation to generate a first token and a second token.

According to a further aspect, the non-transitory, computer-readable medium of the third aspect or any other aspect, wherein the instructions, when executed by the computer, cause the computer to positively verify an identity of a subject associated with the second biometric representation based on a comparison between the first token and the second token.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
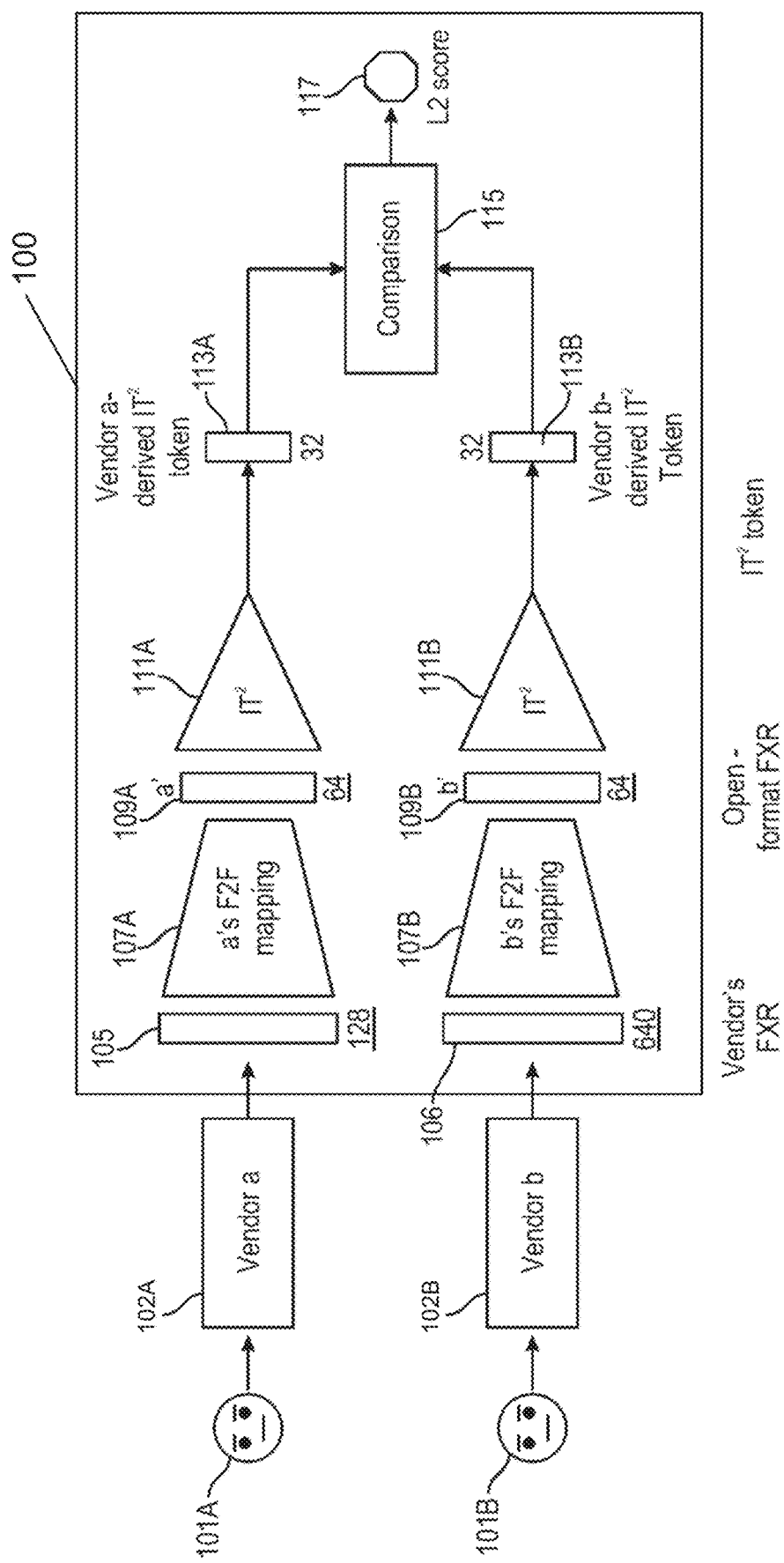
FIG. 1A shows an exemplary biometric system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein, "biometric template" generally refers to an electronic representation (e.g., data object(s)) of biometric signatures sourced from biometric sources including, but not limited to, facial scans, palm scans, fingerprints, retinal scans, sounds, and signals, among others. Thus, the present biometric sources are not limited to physical or behavioral sources, but may include any source that produces data suitable for representation via a set of unrelated data objects. As used herein, the term "biometric template" will be synonymous with "biometric representation."

In one or more embodiments, biometric template generally refers to a biometric reference that is generated when a person first presents themselves to a biometric system (e.g., as an output of an enrollment process). As used herein, a biometric probe generally refers to a live biometric which is acquired during the system operation. As one example, an embodiment of the present system can match a biometric probe against a gallery of N template representations for purposes of biometric identification. As another example, an embodiment of the present system matches a biometric probe against a known subject's biometric template in a 1:1 biometric verification operation.

Overview

Aspects of the present disclosure generally relate to systems and processes for generating and using interoperable biometric representations.

In one or more embodiments, the system translates a biometric representation of any vendor into an interoperable format. In various embodiments, by the present system, two or more vendors can compare biometric representations of dissimilar original format. According to one embodiment, the systems and methods provide for interoperable biometrics without requiring a vendor to alter processes for initial capture and representation of biometric data. In at least one embodiment, the system further transforms interoperable biometric representations into tokens that preserve interoperability while providing additional privacy and security.

In one or more embodiments, the process includes determining a minimum representation size (e.g., referred to as "dimension" or "length") based on biometric representations of two or more vendors. As used herein, dimension can refer to a number of basis vectors in a sub-space that defines the biometric representation. In at least one embodiment, the process includes training a feature-to-feature mapping function to translate a biometric representation of a first format (e.g., a vendor's native format) to a common format, a size of the common format representation being less than or equal to the minimum dimension. In one example, the mapping function is a common, open neural network-based architecture, such as, for example, "arcface" from deep face analysis toolbox InsightFace. Training can be performed using a gallery of real and/or synthetic biometric templates. The process can include defining and training a feature-to-feature mapping function for each of the two or more vendors, each feature-to-feature mapping function being configured to translate that particular vendor's biometric representation to a common-format representation.

In various embodiments, the process includes applying feature-to-feature mapping function to the biometric representation to generate a common representation. In at least one embodiment, the process includes applying a dimensionality reduction algorithm to the common representation to reduce the dimension of the common representation to a second dimension that is less than or equal to a minimum dimension demonstrated by biometric representations of the two or more vendors. The process can include training the dimensionality reduction on a gallery of real and/or synthetic biometric representations. In some embodiments, the process includes receiving a biometric representation in the common format and applying a dimensionality reduction algorithm to the common biometric representation to generate a dimension-reduced common representation such that a dimension of the dimension-reduced common representation is equal to or less than a dimension of a common representation generated from a vendor-formatted representation. In one or more embodiments, the process includes applying a lossy transformation to the common representation to generate a privacy-secured token. In at least one embodiment, the process includes defining a dimension of the privacy-secured token to be less than the dimension of the common representation (e.g., or the dimension-reduced common representation).

Exemplary Embodiments

Figure 1B:
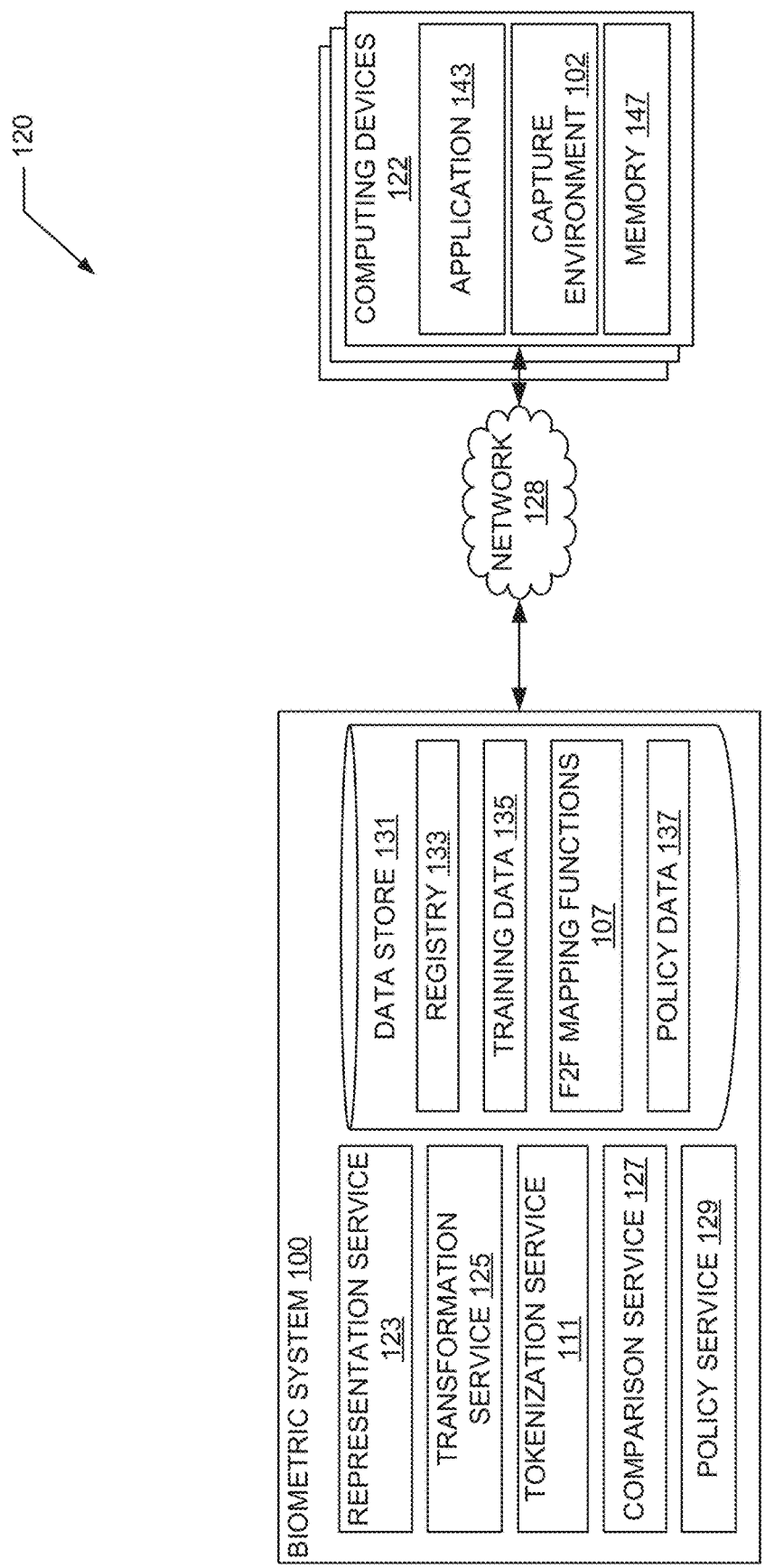
FIG. 1B shows an exemplary network environment in which the present biometric system may operate, according to one embodiment of the present disclosure.

Referring now to the figures, for the purposes of example and explanation of the fundamental processes and components of the disclosed systems and processes, reference is made to FIG. 1A, which illustrates an exemplary biometric system 100 according to one embodiment of the present disclosure. As will be understood and appreciated, the exemplary biometric system 100 shown in FIGS. 1A and 1B represent merely one approach or embodiment of the present disclosure, and other aspects are used according to various embodiments of the present disclosure.

In various embodiments, the biometric system 100 can receive biometric representations from a first capture environment 102A and a second capture environment 102B. In one or more embodiments, the capture environments 102A, 102B are native biometric capture systems from different vendors (e.g., each vendor configured to generate biometric representations in a different format). In some embodiments, the biometric system 100 includes a capture environment for receiving biometric images and transforming the biometric images into fixed-size representations (FXRs), such as vectors of any suitable dimension.

The first capture environment 102A can generate a biometric representation 105 of a subject 101A. The second capture environment 102B can generate a biometric representation 106 of a subject 101B, whose identity is the same of that of the subject 101A. The first capture environment 102A and second capture environment 102B can be native biometric systems of different vendors (e.g., software developer kits (SDKS) for biometric enrollment) and, as a result, the biometric representation 105 and biometric representation 106 demonstrate differing formats and cannot be readily compared for purposes of identifying or validating the subject 101A, 101B. In at least one embodiment, the first capture environment 102A and second capture environment 102B demonstrate an equal error rate (e.g., a measure of biometric matching accuracy) that is less than a threshold set at the equal error rate (EER) operating point which gives rise to an EER value of 3%, for example. According to one embodiment, the translation of vendors' representations from a native format to a common, interoperable format, may result in a further tolerable, degradation in biometric performance (i.e., increase in EER).

In some embodiments, the first capture environment 102A or second capture environment 102B generates a common representation 109. In other words, in at least one embodiment, the biometric system 100 does not map a non-interoperable biometric representation 105 to a common representation 109A, but, instead, receives a biometric image in a generally unaltered or raw format and generates a common representation 109 of the biometric image. In one example, a vendor implements the capture environment 102A as an inline frame, or the like, by which a biometric image can be collected directly into the biometric system 100 without passing through a server controlled by the vendor.

In one or more embodiments, the biometric system 100 includes a feature-to-feature mapping function 107A that transforms biometric representations from a first format associated with the first capture environment 102A to a common format. In various embodiments, the biometric system includes a feature-to-feature mapping function 107B that transforms biometric representations from the second capture environment 102B to the common format. In some embodiments, in instances where biometric representations from the capture environment 102A or 102B are already in the common format, the feature-to-feature mapping function 107A or 107B is replaced by a dimensionality reduction function that reduces a dimension of the biometric representation to a particular dimension parameter.

In various embodiments, the feature-to-feature mapping functions 107A, 107B include trained deep neural networks, or other suitable machine learning models for encoding biometric representations from a first state (e.g., a proprietary or other non-interoperable format) to an interoperable state (e.g., thereby enabling cross-format comparison of biometric data). In some embodiments, the biometric system 100 is a Software-as-a-Service (SaaS) platform. For example, for each feature-to-feature mapping function 107A, 107B, the biometric system 100 includes a corresponding set of centralized and/or distributed computing resources that communicate with the first capture environment 102A via a first network or with the capture environment 102B via a second network. In various embodiments, as shown in FIG. 1B and described herein, the biometric system 100 includes a transformation service 125 that generates, trains, and executes and/or feature-to-feature (F2F) mapping functions and dimensionality reduction functions.

In at least one embodiment, the feature-to-feature mapping function 107A and/or feature-to-feature mapping function 107B apply one or more techniques to convert the biometric representations 105, 106 to common representations 109A, 109B. In various embodiments, the common representations 109A, 109B are fixed-sized, vector representations of biometric data, and the common representations 109A, 109B demonstrate matching properties (e.g., size, dimension, etc.) that enable precise and accurate comparison. Non-limiting examples of feature-to-feature mapping techniques performed to generate the common representations 109A, 109B include machine learning models (e.g., trained deep neural networks or other suitable machine learning architectures), dimensionality reduction techniques and algorithms, and principal component analysis (PCA). In one example, the feature-to-feature mapping function 107A can include a trained multi-layer perceptron that transforms the biometric representation 105 into the common representation 109A. In this example, the multi-layer perceptron may act as a universal function approximator between the native format of the capture environment 102A and the common, interoperable format.

In an exemplary scenario, a first vendor can initiate biometric enrollment of a subject by capturing a facial image of the subject. At the capture environment 102A, the first vendor can generate a 128-byte biometric representation 105 of the facial image in a proprietary format, thereby avoiding storage of the facial image in a raw, non-obfuscated format but preventing utilization of the biometric representation 105 by a second vendor due to non-interoperability. The first vendor can store the biometric representation 105 as a biometric template for future identification and validation of the subject.

Continuing the scenario, a biometric system of a second vendor can attempt to verify an identity of same subject by capturing a facial image of the subject and generating a 640-length biometric representation 106 in the second vendor's proprietary format. The first vendor and second vendor may wish to confirm that the 640-length biometric representation 106 and the 128-length biometric representation 105 represent the same subject; however, the mismatching formats likely prevent precise and accurate comparison. To provide for interoperability between the first vendor and the second vendor, the biometric system 100 can receive the biometric representations 105, 106. The biometric system 100 can process the biometric representations 105, 106 via corresponding feature-to-feature mapping functions 107A, 107B. The feature-to-feature mapping functions 107A, 107B can transform the biometric representations 105, 106 into 128-length common representations 109A, 109B. The second vendor (e.g., or another system in communication therewith, such as the biometric system 100) can precisely and accurately compares the common representations 109A, 109B due to their shared format and output a similarity score. The second vendor can confirm that the similarity score satisfies a minimum threshold and, in response, positively identify the subject.

In at least one embodiment, the feature-to-feature mapping functions 107A, 107B 107A, 107B include deep neural network-based embedding architectures that generate the common representations 109A, 109B. The biometric system 100 can train an embedding architecture for each original format for which interoperability is desired. In other words, the biometric system 100 can generate and train a different deep neural network (e.g., or other suitable model or function) for converting biometric representations from each vendor's native format to a common format. For example, to provide interoperable biometric representations across three different vendor formats, the biometric system 100 can generate and train three different deep neural networks for translating each vendor format to the common format.

In some embodiments, the biometric system 100 includes a tokenization service 111A, 111B for tokenizing biometric representations into privacy-secured, irreversibly transformed tokens 113A, 113B. According to one embodiment, the tokens 113A, 113B demonstrate a smaller size than the corresponding common representations 107A, 107B and thus the tokens 113A, 113B serve as a data dense, compact, and privacy-secured representation of the subject 101A, 101B. The tokenization service 111A, 111B can apply a lossy transformation to translate the common representations 109A, 109B to the tokens 113A, 113B. Exemplary systems and processes for lossy transformation of biometric representation into privacy-secured, representations are described in U.S. patent application Ser. No. 16/406,978, filed May 8, 2019, entitled "SYSTEMS AND METHODS FOR ENHANCED HASH TRANSFORMATIONS," which claims the benefit of and priority under: U.S. Application No. 62/829,825, filed Apr. 5, 2019, entitled "EVERGREEN HASH"; and U.S. Application No. 62/668,576, filed May 5, 2018, entitled "THE EVERGREEN HASH," all of which are incorporated herein by reference as if fully set forth in their entireties. In some embodiments, the token 113 refers to transformed, privacy-secured (TPS) templates, Evergreen (Eg) Hashes, or fuzzy, irreversibly transformed (IT) 2 tokens. In at least one embodiment, the tokenization service 111A, 111B performs tokenization according to a pseudorandom key. According to one embodiment, to provide cross-vendor interoperability, the tokenization environment 111A, 111B tokenizes biometric representations from each vendor using the same pseudorandom key.

In at least one embodiment, the biometric system 100 includes a comparison service 115, such as, for example a biometric matcher. The comparison service 115 can perform biometric comparisons at speed and scale for purposes of biometric identification and validation. The comparison service 115 can output a score 117 for quantifying the comparison. Exemplary metrics for biometric comparison include squared Euclidean distance and $L^2$ norm. In one example, the comparison service 115 compares a common representation 109A to a common representation 109B and generates a squared Euclidean distance score 117 based on the comparison. In another example, the comparison service 115 compares a token 113A to a token 113B and generates an $L^2$ norm score 117 based on the comparison.

FIG. 1B shows an exemplary network environment 120 in which an embodiment of the biometric system 100 may operate. As will be understood and appreciated, the network environment 100 and biometric system 100 shown in FIG. 1B represent merely one approach or embodiment, and other aspects are used according to various embodiments of the present disclosure.

In various embodiments, the biometric system 100 is a computing environment that communicates, via a network 108, with at least one computing device 122. The biometric system 100 can include a server computer, or any other system providing computing capability. Alternatively, the computing environment may employ a plurality of computing devices that may be arranged, for example, in one or more server banks or computer banks or other arrangements. Such computing devices can be located in a single installation or may be distributed among many different geographical locations. For example, the computing environment can include a plurality of computing devices that together may include a hosted computing resource, a grid computing resource, and/or any other distributed computing arrangement. In some cases, the computing environment can correspond to an elastic computing resource where the allotted capacity of processing, network, storage, or other computing-related resources may vary over time.

According to one embodiment, the computing device 122 generally refers to electronic systems and devices that capture, process, store, and/or perform actions based at least in part on biometric data. The computing device 122 can include, or be associated with, a native biometric system (e.g., also referred to herein as a "vendor system." For example, a first computing device 122 may be associated with a first vendor system that generates biometric representations of length 640 bytes and a second computing device 122 may be associated with a second vendor system that generates biometric representations of length 512 bytes. In at least one embodiment, the biometric system 100 accesses one or more application programming interfaces (API) to facilitate communication and interaction between the biometric system 100 and one or more computing devices 122.

In various embodiments, the computing device 122 includes an application 143, a capture environment 102, and memory 147 that may embody a native biometric system, such as a biometric capture, enrollment, and matching system of a particular vendor. In at least one embodiment, the computing device 122 includes any capture device or system in communication with a capture device (e.g., such as a surveillance system connected to one or more security cameras). Non-limiting examples of capture devices include mobile devices (e.g., such as smartphones, tablets, smart accessories, etc.), network-enabled camera systems, and Internet of Things (IoT) devices. In various embodiments, the computing device 122 includes an application 143 for accessing services and functions of the biometric system 100, and for transmitting data therebetween. In some embodiments, embedding a biometric scan (e.g., and/or non-biodata) includes installing and/or registering the application 143 to the computing device 122.

In at least one embodiment, the computing device 122 includes a capture environment 102 including a capture software development kit (SDK) for receiving biometric data (e.g., facial images, fingerprint scans, palm scans, iris scans, etc.) and generating representations of the biometric data in a native or common format. In one or more embodiments, the computing device 122 includes a biometric capture device, such as a scanner, camera, microphone, touch screen, and other input recording devices. In various embodiments, the capture environment 102 receives biometric data (e.g., facial images, fingerprint images, iris scans, voice signatures, etc.) and transforms the biometric data into a variable or fixed-size representation (e.g., via an open source or proprietary biometric software developer kit (SDK)). In some embodiments, the computing device 122 captures or receives biometric data and transmits the biometric data to the biometric system 100 for encoding into native- or common-formatted biometric representations. In at least one embodiment, the application 143 receives biometric representations and processes the biometric data through a biometric matcher (e.g., according to a particular capture software development kit (SDK) and a particular matcher SDK) to perform 1:1 biometric verification or 1:N biometric identification. In various embodiments, the application 143 generates and transmits requests to the biometric system 100 for converting native-formatted biometric representations to a common format (e.g., and, further, to a token format) or for reducing the dimension of a common-formatted biometric representation.

In one or more embodiments, the computing device 122 includes memory 147 for storing various data, such as, for example, native-formatted biometric representations, common-formatted biometric representations, and tokens derived therefrom. In one example, the memory 147 can temporarily store a native-formatted representation generated via the capture environment 102. Continuing the example, the biometric system 100 can receive the native-formatted representation, transform the native-formatted representation into a common-formatted representation, and derive a lossy token from the common-formatted representation. In the same example, the application 143 can receive the lossy token from the biometric system 100, store the lossy token in memory 147, and remove, from the memory 147, the native-formatted representation.

In one or more embodiments, the application 143 generates and causes the computing device 122 to render user interfaces for accessing services and functions of the biometric system 100, for rendering instructions and other information from the biometric system 100, and for receiving input from the user (e.g., selections to fields, typed input, etc.). In one example, the application 143 can generate a user interface including alignment and lighting instructions for capturing a biometric image.

The network 108 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. For example, the biometric system 100 can communicate with a first computing device 122 over a first network 108 and communicate with a second computing device 122 over a second network. In this example, the first computing device 122 and first network 108 can be associated with a first vendor system and the second computing device 122 and second network can be associated with a second vendor system, distinct from the first vendor system.

The biometric system 100 can execute various applications and functionalities described herein. Various data can be stored at the biometric system 100 in a data store 131. The data stored in the data store 131, for example, may be associated with the operation of the various applications and/or functional entities described below. The data store 131 can be representative of a plurality of databases as can be appreciated. In various embodiments, the data store 131 includes, but is not limited to, one or more registries 133, training data 135, F2F mapping functions 107, and policy data 137. In various embodiments, the registry 133 stores biometric representations (e.g., fixed-sized representations, privacy-secured tokens, etc.) and identifiers for associating the biometric representations with one or more subjects or groupings. The registry 133 can store multiple biometric representations of the same subject. The biometric system 100 can delete biometric representations from the registry 133 and, thereby, "cancel" the link between the biometric representations and subjects represented thereby. According to one embodiment, the unlinkability and cancellability of the present biometric representations advantageously improves security and reduces a likelihood that biometric data or other PII can be accessed, viewed, or generated by an attacker.

The data store 131 can include training data 135 that can be used by the transformation service 125 to train feature-to-feature (F2F) mapping functions for transforming biometric representations between various formats. In one or more embodiments, the training data 135 includes biometric information associated with human subjects (e.g., an individual whose biometric information is recorded and represented by the biometric system 100 and/or computing devices 122) and artificially generated biometric information. The training data 135 can include, for example, real and synthetic biometric representations, biometric transformation parameters (e.g., for generating, transforming, and reverse-transforming biometric representations of a subject or subject data), encrypted data, pseudonymous identifiers, error correcting codes, and auxiliary data with which a subject is associated. The training data 135 can include training datasets for training F2F mapping functions 107 (e.g., deep neural networks) and/or dimensionality reduction functions. For example, the training data 135 can include a training dataset including a plurality of mated and non-mated biometric images (e.g., or biometric representations derived therefrom) that are associated with a plurality of human subjects. In another example, the training data 135 can include a training dataset including a plurality of mated and non-mated synthetic biometric images (e.g., the training dataset excludes biometric data associated with real human subjects). The training data 135 can be segregated into datasets for training, testing, and validating F2F mapping functions 107 and dimensionality reduction models, as can be appreciated. The training data 135 can include metadata, such as labels for indicating mated and non-mated biometric samples, for indicating an environment and/or conditions thereof associated with a biometric sample, or for indicating one or more conditions of the biometric sample (e.g., poorly lit, rotated orientation, partially obstructed biometric feature, skin color, etc.).

The training data 135 can include real and synthetic biometric images (e.g., or encoded representations thereof) that are associated with various optimal and non-optimal conditions. Non-limiting examples of optimal conditions include studio lighting (e.g., an image that demonstrates balanced sharpness and contrast), high resolution (e.g., 720 p, 1080 p, 4k p, etc.), and fully visibility of the biometric feature(s). Non-limiting examples of non-optimal conditions include underlit lighting condition, overlit lighting condition, blurred image, adverse backlight condition (e.g., a background environment of the image is more prominently lit and/or in focus as compared to the biometric feature(s)), rotation condition (e.g., a biometric feature is rotated relative to the capture device or virtual camera), dissimilar biometric position, posture, and/or expression between mated images or representations, and inclusion of multiple subjects in a single image. In some embodiments, for representation or token matching operations used to evaluate F2F mapping function performance, the transformation service 125 uses biometric representations associated with optimal conditions as biometric enrollment representations. In at least one embodiment, for said matching operations, the transformation service 125 uses biometric representations associated with non-optimal conditions as biometric probe representations (e.g., representations that are compared to enrollment representations to determine accuracy of F2F mapping functions and dimensionality reduction functions described herein).

The data store 131 can include F2F mapping functions 107, such as, for example machine learning models trained to transform a biometric representation from a first format (e.g., a proprietary vendor format or uncommon open format) to a common format (e.g., a second proprietary vendor format or another designated common format). Non-limiting examples of machine learning models include neural networks, linear regression, logistic regression, ordinary least squares regression, stepwise regression, multivariate adaptive regression splines, ridge regression, least-angle regression, locally estimated scatterplot smoothing, Bayesian algorithms, hierarchical clustering, k-nearest neighbors, K-means, expectation maximization, learning vector quantization, self-organizing map, locally weighted learning, least absolute shrinkage and selection operator, elastic net, feature selection, computer vision, dimensionality reduction algorithms, and canonical correlation analysis. Neural networks can include, but are not limited to, uni- or multilayer perceptron, convolutional neural networks, recurrent neural networks, long short-term memory networks, auto-encoders, deep Boltzman machines, deep belief networks, back-propagations, stochastic gradient descents, Hopfield networks, radial basis function networks, and deep-learning based canonical correlation analysis.

The F2F mapping functions 107 can include properties, parameters, and hyperparameters that are stored at the data store 131 (e.g., and may be manipulated by the transformation service 125 to train and improve F2F mapping function performance). Non-limiting examples of properties, parameters, and hyperparameters include coefficients or weights of linear and logistic regression models, weights and biases of neural network-type models, number of estimators, cluster centroids in clustering-type models, train-test split ratio, learning rate (e.g. gradient descent), maximum depth, number of leaves, column sample by tree, choice of optimization algorithm or other boosting technique (e.g., gradient descent, gradient boosting, stochastic gradient descent, Adam optimizer, etc.), choice of activation function in a neural network layer (e.g. Sigmoid, ReLU, Tanh, etc.), choice of cost or loss function, number of hidden layers in a neural network, number of activation units in each layer of a neural network, drop-out rate in a neural network (e.g., dropout probability), number of iterations (epochs) in training a neural network, number of clusters in a clustering task, Kernel or filter size in convolutional layers, pooling size, and batch size.

In at least one embodiment, the policy data 137 includes information defining policies by which a policy service 129 analyzes and evaluates biometric representations, biometric comparisons, biometric images, synthetic biometric data, F2F mapping function performance, and dimensionality reduction performance. In one example, the policy data 137 can include one or more predetermined similarity thresholds for determining biometric identification and verification decisions. In another example, the policy data 137 can include a liveness threshold for determining liveness verification decisions. In another example, the policy data 137 can include predetermined thresholds for evaluating optimal versus non-optimal conditions, such as threshold values for image quality, brightness, contrast, anatomical geometry, and orientation. In another example, the policy data 137 can include predetermined accuracy, error, precision, and/or deviation thresholds for training F2F mapping functions 107.

In one or more embodiments, because the data store 131 may only store biometric representations derived using proprietary processes and pseudorandom seeds, the data stores 131 does not include any original biometric scans, thereby reducing a risk of exposing subjects' biometric data, for example, if the database were compromised or breached. Furthermore, in the event of a breach at the data store 131, stolen training data 135 may be unusable to an attacker, because the breached information is not directly linked to a subject's actual likeness.

In various embodiments, the biometric system 100 includes, but is not limited to, a tokenization service 111, a comparison service 115, a representation service 123, an encoding service 113, a comparison service 115, and a policy service 129.

The representation service 123 can receive biometric data (e.g., and non-biodata, such as personal identifiable data (PII)) and generate fixed-size biometric representations of the biometric data. For example, the representation service 123 can receive a facial image and generate a fixed-size, vector-based representation of the facial image. The representation service 123 can perform hashing processes for translating biometric data from a variable-size representation to a fixed-size representation. The representation service 123 can generate biometric representations based on one or more transformation parameters, and can define the one or more transformation parameters based on a pseudorandomly generated value (e.g., referred to as a pin or a seed value). Non-limiting examples of transformation parameters, include salt values that may be added to biometric data (e.g., for increasing the security of the biometric representation) and parameters for modifying a biometric image, such as values for controlling shift, rotation, scale, brightness, or contrast modifications.

The representation service 123 can perform biometric capture processes, such as, for example, image realignment, masking, and feature extraction. For example, the representation service 123 may include a biometric capture software developer kit (SDK). The representation service 123 can generate a biometric representation by encoding a biometric scan into a vector-based representation, normalizing the vector-based representation, performing a one-to-many comparison between the normalized vector-based representation and a set of unrelated biometric representations (e.g., referred to as a "gallery"), and defining the biometric representation based on the comparison. In various embodiments, the representation service 123 generates representations of data via one or more encoders that encode various data types into embedded vectors or other fixed size representations. For example, the representation service 123 can includes a string encoder that encodes non-biodata into embedded vectors, which serve as fixed size representations of the non-biodata. In another example, the representation service 123 includes a neural network encoder (e.g., such as arcface or dlib) that generates a fixed size representation of a facial image, or other suitable biometric data. In at least one embodiment, the representation service 123 includes encoders for encoding various data types into embedded vectors. In one or more embodiments, the encoders include neural network or other machine learning-based encoders. Non-limiting examples of encoders include palm print encoders, facial encoders, iris encoders, anatomical geometry encoders (e.g., such as hand geometry encoders), image encoders, and anatomical minutiae encoders (e.g., such as an anatomical texture encoder for inner finger texture).

In various embodiments, the representation service 123 includes a synthetic data generator that generates artificial representations of anatomy or other data (e.g., for example, text strings) to be represented via the present processes. In one or more embodiments, synthetic data demonstrates one or more advantages over real data, such as, for example infinite variation, cost effectiveness, lack of data privacy concerns, full and precise control over ambient environment, simulatability, and accuracy (e.g., due to use of metadata for labelling synthetic images). In at least one embodiment, the representation service 123 generates synthetic facial images under varying artificial conditions, such as, for example, the synthetic facial images 1201, 1203, 1205, 1207, 1209 shown in FIG. 12. In various embodiments, the representation service 123 generates sets of mated biometric images under varying conditions (e.g., lighting conditions, orientation conditions, skin conditions, etc.).

In one or more embodiments, the representation service 123 generates a synthetic image by generating a synthetic anatomy texture (e.g., such as a synthetic facial texture and geometry) and a synthetic anatomy shape (e.g., such as a three-dimensional human head). In various embodiments, the representation service 123 renders the synthetic image by mapping the synthetic anatomy texture to the synthetic anatomy shape and rendering the synthetic mapping in three dimensions. In at least one embodiment, parameters of the synthetic anatomy texture and the synthetic anatomy shape can be define based on a pseudorandom seed value. In one or more embodiments, the synthetic anatomy shape includes configurable settings for base skin color, cosmetics, prosthetics, disfigurations, deformities, face coverings, and other suitable properties. In at least one embodiment, the synthetic anatomy texture includes configurable settings for roughness, blemishes, birthmarks, scarring, laugh lines, and other suitable properties. In one or more embodiments, the three-dimensional rendering includes configurable settings for ambient light source (e.g., natural lighting, incandescent lighting, studio lighting, fluorescent lighting, LED lighting, etc.), lighting condition, anatomy orientation (e.g., front-facing, left-facing, side-facing, rotation from 0-360 degrees, etc.), facial expression (e.g., neutral, smiling, frowning, angry, anxious, surprised, morose, etc.), synthetic texture quality (e.g., for generating oily textures, dry textures, etc.), distance from a virtual camera, and other suitable properties. In at least one embodiment, lighting conditions include, but are not limited to, optimal (e.g., studio quality lighting in which a biometric feature is fully visible and demonstrates balanced sharpness and contrast), overlit, underlit, asymmetrically lit, and adverse backlight (e.g., a region behind a biometric feature is more prominently lit and/or focused upon as compared to the biometric feature).

The transformation service 125 can transform fixed-size representations from a first format to one or more secondary formats. In at least one embodiment, the transformation service 15 maps biometric representations from a first, native vendor format to an open source format or other common format (e.g., a second, native vendor format), thereby providing for representation interoperability across multiple vendors utilizing disparate biometric embedding processes. The transformation service 125 can generate, train, and execute feature-to-feature (F2F) mapping functions 107 for mapping biometric representations between various formats. In various embodiments, the transformation service 125 generates machine learning models (e.g., neural networks) that receive, as input, a biometric representation of a first format and generate, as output, a transformed version of the biometric representation in a second format. In at least one embodiment, the transformation service 125 trains F2F mapping functions 107 using training data 135.

The transformation service 125 can generate a training dataset including a plurality of mated and non-mated facial images (e.g., or other suitable biometric data) associated with a plurality of human subjects. The transformation service 125 can generate fixed-size representations of the facial images in a dlib-based format via the representation service 123 (e.g., or a capture environment 102 of the computing device 202). The transformation service 125 can generate an initial iteration deep neural network for converting the fixed-size representations from the dlib-based format to an arcface-based format. The transformation service 125 can execute the initial iteration deep neural network on the fixed-size representations (FXRs) to map the FXRs from the dlib format to the arcface format, thereby generating transformed FXRs in the arcface-based format. The transformation service 125 can determine a baseline level of biometric matching performance by causing the comparison service 127 to perform 1:N biometric matching on the initial, dlib-formatted FXRs (e.g., the baseline level referring to a value of Equal Error Rate (EER), or other suitable metric for scoring biometric matching accuracy). The transformation service 125 can determine a biometric matching performance level of the initial iteration deep neural network by causing the comparison service 127 to perform 1:N biometric matching on the arcface-formatted, transformed FXRs. The policy service 129 can compare the biometric matching performance level to the baseline level and/or to one or more performance thresholds specified in policy data 137. Based on the comparison, the transformation service 125 can determine that the initial iteration deep neural network fails to meet a desired or requisite performance level. In response to the determination, the transformation service 125 can adjust one or more properties of the initial iteration deep neural network (e.g., activation functions, weight initialization, number of hidden units and layers, learning rate, hyperparameter tuning, etc.), thereby generating a secondary iteration deep neural network.

The transformation service 125 can repeat the process of transforming the initial, dlib-formatted FXRs into arcface-formatted FXRs, and, based thereon, the transformation service 125 can determine a biometric matching performance level for the secondary iteration deep neural network. The transformation service 125 can iteratively adjust the deep neural network until an iteration of the deep neural network is generated that demonstrates sufficient biometric matching performance. The transformation service 125 can further train the deep neural network on additional training, validation, or testing datasets that include facial images associated with human subjects, synthetic facial images, or combinations thereof. The transformation service 125 can store the final iteration of the deep neural network as an F2F mapping function 107 at the data store 131.

In various embodiments, the transformation service 125 generates training data 135 including synthetic data from the representation service 123. For example, the transformation service 125 can generate synthetic training datasets including mated and non-mated synthetic facial images. In some embodiments, the transformation service 125 generates blended training datasets that include synthetic biometric images and biometric images associated with real human subjects. In at least one embodiment, the transformation service 125 uses one or more training datasets to train machine learning models that perform feature-to-feature mapping for converting biometric representations from a first format to a second format.

The transformation service 125 can train F2F mapping functions 107 on training data 135 associated with various optimal and non-optimal conditions, thereby providing robust and error-tolerant biometric transformation architectures. For example, the transformation service 125 can train a deep neural network using a training dataset that includes sets of mated biometric samples (e.g., sets being non-mated to other sets). In this example, each set of mated biometric samples can include a biometric sample associated with an optimal capture condition and one or more biometric samples associated with non-optimal conditions, such as adverse backlighting, rotated biometric feature, varied biometric expression or posture, overlit, or underlit.

In various embodiments, the transformation service 125 includes and applies one or more dimensionality reduction models, algorithms, or techniques for reducing a dimension of a biometric representation (e.g., while maintaining a format of the biometric representation. For example, the transformation service 125 receives a 512-byte vector representation of a biometric sample that was generated via an additive angular margin loss (arcface)-based neural network. Continuing the example, the transformation service 125 applies one or more dimensionality reduction techniques to reduce the 512-byte vector representation to a 64-byte vector representation (e.g., while retaining the arcface-based format). In some embodiments, the transformation service 125 includes a dimensionality reduction environment, such as the dimensionality reduction environment 205 shown in FIG. 2 and described herein.

The tokenization service 111 can generate a privacy-secured token by applying a lossy, irreversible transform that tokenizes the biometric representation such that the output token contains less information as compared to the biometric representation. In one example, the representation service 123 can generate a fixed-size representation of a facial image by encoding the facial image into a vector. Continuing the example, the tokenization service 111 can generate a privacy-secured token of the fixed-size representation by performing a lossy transformation. In various embodiments, the tokenization service 111 transforms outputs from the representation service 123 or transformation service 125 into irreversibly transformed, privacy-secured tokens by applying one or more transformation and hashing functions. In various embodiments, the transformation and hashing functions used by the tokenization service 111 are one-way transformations, meaning that the transformation is irreversible. In one or more embodiments, tokens generated by the tokenization service 111 demonstrate security properties including revocability, renewability, diversity, non-linkability, and irreversibility.

In one or more embodiments, the tokenization service 111 generates a token by concatenating a fixed-size representation (FXR) with a cryptographic key (e.g., from a pseudo-randomly seeded cryptographic key derivation function), or other secret data, to generate a concatenated representation. In one or more embodiments, the tokenization service 111 permutes the concatenated representation with the FXR and/or the cryptographic key to generate a permuted representation. In at least one embodiment, the tokenization service 111 generates one or more transformation parameters and projects the permuted representation based on one or more transformation parameters to generate the token. In one example, the tokenization service 111 may generate a pseudorandom projection matrix based on a seed value (e.g., which may be pseudorandomly generated based on a seeding via a received or retrieved key or other secret data). Continuing the example, the tokenization service 111 can multiply an FXR output of the representation service 123 or transformation service 125 by the pseudorandom projection matrix to generate a lossy, irreversible, privacy-secured token. According to one embodiment, the tokens generated by the tokenization service 111 can be revoked and replaced with new tokens. In at least one embodiment, old and the new tokens cannot be linked together (e.g., a security property referred to as "non-linkability").

In one or more embodiments, the tokenization service 111 applies a whitening transformation (e.g., such as an iterative spherical whitening transformation) to embedded vectors or fixed-size biometric representations prior to converting the embedded vectors or fixed-size biometric representations to irreversibly transformed, privacy-secured tokens. According to one embodiment, the whitening transformation improves token security by increasing a difficulty of reversing an irreversible transformation or reconstructing a biometric sample or representation with which a privacy-secured token is associated.

In one or more embodiments, the tokenization service 111 performs lossy transformation according to one or more embodiments described in:

U.S. application Ser. No. 16/406,978, filed May 8, 2019, entitled "SYSTEMS AND METHODS FOR ENHANCED HASH TRANSFORMATIONS," which claims the benefit of and priority to:

U.S. Application No. 62/829,825, filed Apr. 5, 2019, entitled "EVERGREEN HASH"; and U.S. Application No. 62/668,576, filed May 5, 2018, entitled "THE EVERGREEN HASH";

U.S. application Ser. No. 17/230,684, filed Apr. 14, 2021, entitled "SYSTEMS AND METHODS FOR MULTI-MODAL BIOMETRICS," which claims the benefit of and priority to:

U.S. Application No. 63/009,809, filed Apr. 14, 2020, entitled "SYSTEMS AND PROCESSES FOR TOUCHLESS BIOMODAL BIOMETRICS"; and U.S. Application No. 63/011,447, filed Apr. 17, 2020, entitled "SYSTEMS AND PROCESSES FOR TOUCHLESS BIOMODAL BIOMOETRICS"; or U.S. application Ser. No. 16/841,269, now U.S. Pat. No. 11,301,586, filed Apr. 6, 2020, entitled "SYSTEMS AND METHODS FOR LOSSY BIOMETRIC REPRESENTATIONS," which claims the benefit of and priority to U.S. 62/829,825, filed Apr. 5, 2019, entitled "THE EVERGREEN HASH";

each of which are incorporated herein by reference as if fully set forth in their entireties.

In one or more embodiments, the comparison service 115 performs biometric representation and embedded vector matching processes, such as, for example, one-to-one (1:1) comparisons for biometric validation and one-to-many (1:N) comparisons for biometric identification and/or database deduplication. In at least one embodiment, the comparison service 115 performs one-to-one and one-to many comparisons of biometric representations or privacy-secured tokens for the purposes of biometric validation and identification. According to one embodiment, the comparison service 115 performs a biometric representation comparison by calculating a distance metric (e.g., a squared Euclidean distance, $L^2$ norm, cosine similarity value, etc.) between a probe biometric representation and one or more template representations (e.g., also referred to herein as "enrollment" representations). In at least one embodiment, the policy service 129 applies a policy to the comparison by determining whether the distance metric (e.g., referred to as a similarity score) satisfies a predetermined accuracy threshold. In some embodiments, the comparison service 115 compares a probe biometric representation to two or more template representations that are associated with the same subject, and the comparison service 115 averages the output similarity scores to generate a multi-template, fusion-based score.

In one example, to perform biometric validation, the comparison service 115 can receive a probe biometric representation and an indication of a template biometric representation stored in the registry 105. In this example, based on the indication, the comparison service 115 can retrieve the template biometric representation from the registry 105 and compute a similarity score between the probe biometric representation and the template biometric representation. Continuing the example, policy service 129 can determine that the similarity score meets a minimum matching threshold, and, based thereon, the comparison service 115 can positively verify the identity of the subject with the probe biometric representation is associated. In another example, to perform biometric identification, the comparison service 115 can generate a similarity score between a probe biometric representation and each of a plurality of biometric template representations. In this example, the comparison service 115 can rank the biometric template representations by similarity score and the policy service 129 determines that a top-ranked score satisfies a minimum matching threshold. Continuing the example, the comparison service 115 can determine that an identity of the subject with which the probe biometric representation to be that of an identity with which the top-ranked template biometric representation is associated.

In various embodiments, the policy service 129 evaluates inputs, outputs, and intermediaries of the biometric system 100 based on policy data 137. For example, the policy service 129 compares a liveness verification score to a predetermined liveness verification threshold stored in policy data 137. In another example, the policy service 129 compares an image quality score to a predetermined image quality threshold. In another example, the policy service 129 compares a similarity score to a predetermined similarity threshold.

In at least one embodiment, the policy service 129 transmits affirmative and negative responses to the representation service 123 and comparison service 115. For example, the policy service 129 transmits an affirmative response to the representation service 123 based on a determination that a biometric scan satisfies liveness verification and image quality thresholds. In another example, the policy service 129 transits a negative response to the comparison service 117 based on a determination that a similarity score fails to satisfy a predetermined similarity threshold. In one or more embodiments, the policy service 129 receives policy data 137 (e.g., or inputs for controlling application of the same) from the computing device 122, thereby providing for policy generation and adjustment according to user preferences and requirements.

In one or more embodiments, the policy service 129 performs segmentation, alignment, and cropping processes to generate additional images from an initial capture image (e.g., or another image obtained therefrom). In one example, the policy service 129 aligns a hand image according to a hand alignment template defined in policy data 137. In another example, the policy service 129 segments and crops a hand image to generate additional images of particular hand anatomy including a cropped palm image, a cropped fingers image, and a cropped image of each finger. In another example, the policy service 129 crops a capture image to generate a facial image and aligns the facial image according to a facial template defined in policy data 137.

In one or more embodiments, the policy service 129 includes various algorithms, machine learning models, functions for performing analyses described herein. The various algorithms, machine learning models, and functions can be referred to collectively as "modules." In various embodiments, the policy service 129 includes one or more modules for detecting and segmenting anatomy in an image. For example, the policy service 129 can include a fingertip detection module for identifying fingertips in an image. In another example, the policy service 129 can include a facial feature recognition module for detecting facial features (e.g., nose, eyes, lips, ears, forehead, etc.) in an image. In another example, the policy service 129 can include an anchor point detection module for detecting points of interface between anatomy, such as, for example, points of interface between fingers and a palm. In another example, the policy service 129 can include a segmentation module that detects regions of an image that correspond to anatomy and non-anatomy (e.g., skin and other tissue vs. background). In another example, the policy service 129 can include a geometry module for detecting and mapping anatomical geometry.

In another example, the policy service 129 can include a pose estimation module (e.g., an overall posture estimation module, face pose or expression estimation module, hand pose estimation module, etc.) for detecting orientation and position relationships within anatomy or between two or more particular anatomical features (e.g., such as a first finger and a second finger, or a plurality of fingers and a palm). The pose estimation model can generate geometry data and mapping data for defining anatomy within an image (e.g., a hand, face, etc.) and for defining anatomical elements thereof (e.g., fingers, eyes, mouth, etc.). In one example, the policy service 129 can include a hand classifier model that can determine whether an image includes a right hand or a left hand and/or whether the image includes a hand oriented to a predetermined gesture (e.g., two fingers extended, open palm, etc.). In this example, the hand classifier can be a machine learning model (e.g., a perceptron, decision tree, etc.) that is trained using a corpus of anatomical images of varying quality (e.g., hand images, finger images, etc.). In another example, the policy service 129 includes a facial expression recognition model that predicts whether a facial images includes a smiling, frowning, neutral, angry, surprised, or neutral expression. In one or more embodiments, the policy service 129 uses outputs of one or more modules as inputs to additional modules or other processes, such as, for example, generating training data 135 and training datasets.

Figure 2:
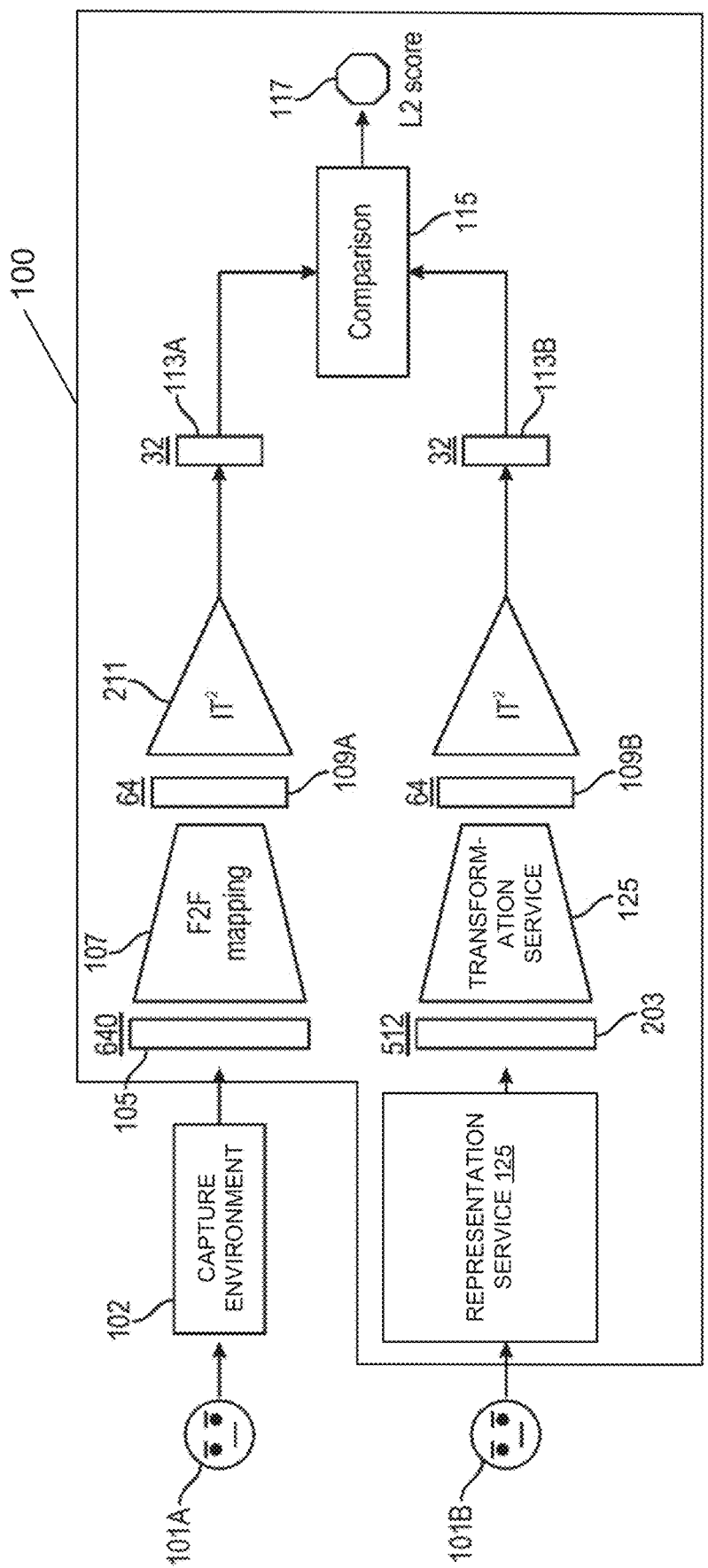
FIG. 2 shows an exemplary biometric system, according to one embodiment of the present disclosure.

FIG. 2 shows another embodiment of the biometric system 100. In some embodiments, the representation service 125 includes a common capture environment that generates biometric representations 203 in a common format. In one example, the common capture environment includes an encoder for generating biometric representations in the common format (e.g., such as an arcface format, dlib format, or any suitable format).

In one or more embodiments, the transformation service 125 includes a dimensionality reduction (DR) environment for translating a biometric representation 203 (e.g., or other biometric representations described herein) from a first dimension (e.g., also referred to as dimension "length" or "size") to a common representation 109 of a second, reduced dimension. In various embodiments, to perform dimensionality reduction, the DR environment applies a dimension reduction algorithm, such as, for example, principal component analysis (PCA), orthogonal random projection, deep generalized canonical correlation analysis (DGCCA), factor analysis (FA), linear discriminant analysis (LDA), truncated singular value decomposition (SVD), kernel PCA, t-distributed stochastic neighbor embedding (t-SNE), multidimensional scaling (MDS) and isometric mapping, which may deploy additional strategies such as recursive feature elimination (RFE), forward selection, and random forest models.

In one or more embodiments, the biometric system 100 determines the common dimension and/or the reduced common dimension based on Expression 1.

$$\dim^0(\text{Token}) < \dim^0(\text{FXR}_{common}) \leq \min_v(\dim^0(\text{FXR}_v)) \quad \text{(Expression 1)}$$

In various embodiments, $\dim^0$ refers to the observed dimension of a biometric representation. In one or more embodiments, the expression holds true for any FXR that is uniformly distributed. According to one embodiment, the expression holds true for the intrinsic dimension of FXR (e.g., but may not require the uniform distribution property of the FXR). In at least one embodiment, the biometric system 100 implements a common dimension such that the common dimension is less than or equal to the smallest dimension of the vendors' biometric representation. In one example, biometric representations of a first vendor demonstrate a length of 640 and biometric representations of a second vendor demonstrate a length of 128. In this example, the biometric system 100 implements a common dimension of less than or equal to 128 (e.g., the minimum size of the vendors' representations). In another example, biometric representations of a vendor demonstrate a length of 640 and common-formatted biometric representations of a common capture environment demonstrate a length of 512. In this example, a transformation service 125 transforms the vendor's biometric representations into common-formatted representations of length 64 and a DR environment projects the common capture environment's biometric representations to a lower dimensionality of length 64.

In some embodiments, the biometric system 100 enrolls subjects by generating common format biometric representations of a first dimension and projecting the common format biometric representation to a second dimension that is less than or equal to the minimum dimension utilized by the vendors. In at least one embodiment, restricting the common dimension to be less than or equal to a minimum vendor dimension provides for advantageously compact biometric representations that may increase biometric matching speed while maintaining sufficient accuracy. In one or more embodiments, when common format representations are further transformed into privacy-secured tokens, the biometric system 100 implements a privacy-secured dimension such that the privacy-dimension is less than the common dimension.

Table 1 provides exemplary dimensions and constraints thereof between vendor representations $V_1$, $V_2$, a common representation, a dimension-reduced common representation, and a privacy-secured token. In one example, common representation dimension is greater than the smaller dimension of the two vendors' representations and, to satisfy Expression 1, the biometric system projects the common representation to a reduced dimension. In the same example, the biometric system limits a maximum dimension of a privacy-secured token to the reduced dimension value.

TABLE 1

Exemplary Representation Dimensions and Constraints

| Fixed-Size Representation (FXR) or Token | Dimension of FXR |
| --- | --- |
| $\text{FXR}_{v1}$ | 640 |
| $\text{FXR}_{v2}$ | 128 |
| $\text{FXR}_{common}$ | 512 |
| $\text{DR}(\text{FXR}_{common})$ | 64 |
| IT2 token (e.g., a discretised FXR) | 32 |

Figure 3:
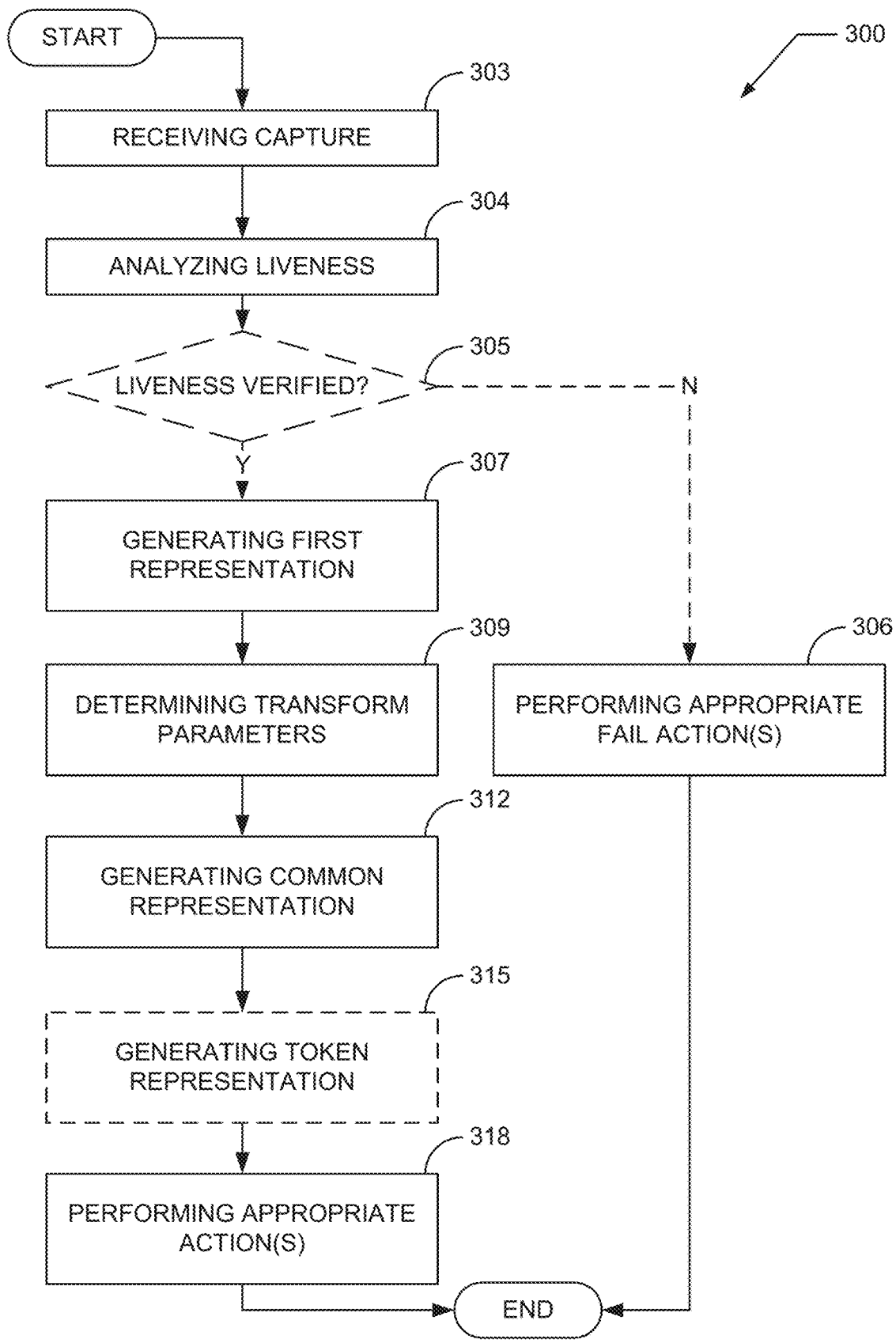
FIG. 3 shows an exemplary sample-capture process, according to one embodiment of the present disclosure.

FIG. 3 shows an exemplary sample-capture process 300, which may be used during enrollment operations and recognition operations (e.g., such as identification or verification operations). As will be understood by one having ordinary skill in the art, the steps and processes shown in FIG. 3 (and those of all other flowcharts and sequence diagrams shown and described herein) may operate concurrently and continuously, are generally asynchronous and independent, and are not necessarily performed in the order shown. Various embodiments of the present system, such as, for example, the biometric system 100 (e.g., shown in FIGS. 1A-B and described herein), perform the enrollment process 300 to generate and store a representation of a subject's biometrics for use in subsequent identification or verification of the subject's identity.

At step 303, the process 300 includes receiving a capture. The capture can include, for example, biometric data, a fixed-size representation of biometric data, or other information to be represented by an output of the process 300. In various embodiments, the biometric system 100 receives a fixed-size biometric representation from a computing device 122, such as a vendor's proprietary biometric system or a remote computing environment for storing biometric representations. In at least one embodiment, the capture includes a first format, such as a vendor's proprietary format or an open source format. According to one embodiment, receiving the capture includes receiving an indication of the format of the capture (e.g., "dlib," "arcface," a particular encoding neural network, etc.). In one or more embodiments, the biometric system 100 determines the format of the capture based on identifying the source of the capture. For example, the biometric system 100 can receive a capture from a computing device 122 associated with "Company A." Continuing the example, the biometric system 100 can retrieve policy data 137 associated with Company A and, based thereon, determine that Company A is associated with a dlib format.

In one or more embodiments, receiving the capture includes receiving an indication of a second format into which a capture may be transformed. In at least one embodiment, at step 303, the biometric system 100 receives a first capture of a first format and a second capture of a second format. In various embodiments, the biometric system 100 determines that the first capture is to be transformed to the second format (e.g., or vice versa), thereby providing interoperability between the first and second captures.

At step 304, the process 300 includes analyzing the capture to determine that the capture is derived from a live subject (e.g., a living human subject). In at least one embodiment, analyzing the liveness of the capture includes analyzing computing a liveness score. The biometric system 100 can evaluate liveness according to one or more embodiments described in U.S. Pat. No. 10,635,894, filed Oct. 13, 2017, entitled "SYSTEMS AND METHODS FOR PASSIVE-SUBJECT LIVENESS VERIFICATION IN DIGITAL MEDIA," which is incorporated herein by reference as if set forth in its entirety.

At step 305, the process 300 includes verifying that the capture is derived from a live subject. In various embodiments, verifying the capture liveness includes comparing a liveness score to one or more predetermined liveness thresholds. In one or more embodiments, in response to determining the capture satisfies the predetermined liveness threshold, the process 300 proceeds to step 307. In at least one embodiment, in response to determining the capture fails to satisfy the predetermined liveness threshold, the process 300 proceeds to step 306.

At step 306, the process 300 includes performing one or more predetermined "fail" actions. Non-limiting examples of fail actions include transmitting an alert (e.g., a text message, electronic mail, push notification, or other electronic communication), suspending access to the biometric system 100 (e.g., for a user, computing device, or other source with which the capture is associated), and denying access to a physical or digital environment. In one example, the biometric system 100 transmits an alert to a computing device 122 from which the capture was received. In this example, the alert causes the computing device 122 to render instructions for acquiring and transmitting a second capture (e.g., the instructions can indicate that a capture must be of a live subject).

At step 307, the process 300 includes generating a first representation of the capture, such as, for example, a biometric representation 105. Generating the first representation can include processing the capture (e.g., a biometric image) through a capture SDK that produces the first representation as an output. The representation service 123 can generate a fixed-sized biometric representation of the capture. In some embodiments, the capture received at step 303 is already in the form of a fixed-size representation (e.g., generation of the FXR can occur at a vendor's native biometric capture environment that generates the first representation in a non-interoperable format). In at least one embodiment, the process 300 may omit step 307, for example, in instances in which the capture of 303 includes a fixed-size representation of a biometric sample.

In some embodiments, the biometric system 100 collects a capture or first representation from a database or other storage environment. In at least one embodiment, the biometric system collects the capture or first representation via an application programming interface (API) or inline frame. For example, the biometric system 100 renders an inline frame on a vendor's webpage (e.g., the webpage hosted by a first computing device 122) and a user uploads a biometric image into the inline frame (e.g., via a second computing device 122). In the same example, the inline frame allows the biometric system 100 to collect the uploaded biometric image via a network (e.g., in some embodiments, without ever passing the raw biometric image through a server controlled by the first computing device 122).

At step 309, the process 300 includes determining parameters for transforming the first representation from a first format (e.g., a vendor's native format in which the first representation was provided) to a common format. Non-limiting examples of parameters include a dimension of the final representation (e.g., a dimension of the common representation or token to which the first representation will be transformed) and whether a common representation will be further transformed into a privacy-secured token. In one or more embodiments, the parameters are predetermined and retrieved based on the computing device 122 from which the capture was received (e.g., or the vendor or other user associated therewith) or based on format(s) and/or dimension(s) one or more biometric representations or tokens to which the capture may be compared. For example, the policy service 129 can retrieve, from policy data 137, one or more policies associated with the computing device 122 from which the capture was received. Continuing the example, based on the policies, the policy service 129 can determine that the capture of step 303 is of a dlib format and includes a dimension of 640 bytes. In the same example, to provide interoperability between the capture and one or more asymmetrically formatted and/or dimensioned biometric representations, the policy service 129 can determine that the capture is to be transformed to a particular format and/or reduced to a particular dimension associated with the one or more asymmetrically formatted and/or dimensioned biometric representations (e.g., arcface format and dimension 64 bytes, a particular neural network encoding format followed by tokenization to a token of dimension 32 bytes, dlib format and dimension 128 bytes, etc.). In at least one embodiment, the biometric system 100 receives the parameters at step 303. In various embodiments, the biometric system 100 determines the dimension parameter as described herein in association with FIG. 2. For example, the biometric system 100 determines that dimension parameter based on Expression 1 shown and described herein.

At step 312, the process 300 includes generating a common representation of the first representation, such as, for example, a common representation 109. In one or more embodiments, the transformation service 125 applies a F2F mapping function 107 to translate the first representation to a common representation. In at least one embodiment, the transformation service 125 trains the feature-to-feature mapping function (e.g., a neural network architecture) using training data 135, such as, for example, one or more training datasets including labelled biometric samples (e.g., the training datasets including sets of mated and non-mated biometric samples). The transformation service 125 can iteratively generate and train a F2F mapping function 107 for transforming the first representation from the format in which it was received to a second format that provides interoperability for (mis) matching the transformed representation of the first representation to one or more additional representations (e.g., which may also have been converted from an original format to the common format).

In various embodiments, the process 300 includes applying a dimensionality reduction algorithm to the common representation, thereby generating a dimension-reduced common representation. The transformation service 125 can perform dimensionality reduction, for example, in instances where a dimension of representations in the common format exceeds a dimension of a representation in any vendor format for which the process 300 is performed.

At step 315, the process 300 includes generating a privacy-secured token representation of the common representation, such as, for example, a token 113. The biometric system can define a dimension of the privacy-secured token representation to be less than or equal to the dimension of the common representation (e.g., which may be less than or equal to the smallest dimension utilized by a vendor from which the first representation was received and/or one or more vendors that process the common representation). Exemplary systems and processes for generating the privacy-secured token are described in one or more of the incorporate references.

In some embodiments, following step 309, the process 300 omits step 315 and proceeds from step 312 to step 318. For example, the biometric system 100 can optionally perform step 315 to increase the security of a final iteration biometric representation output from the process 300. In this example, by performing the lossy transformation of step 315, the biometric system 100 can generate a compact, irreversible, unlinkable token for representing a subject's biometric feature(s).

At step 318, the process includes performing one or more appropriate actions. Non-limiting examples of actions include transmitting and/or storing a common representation or privacy-secured token (e.g., also referred to as "enrollment"), generating a user account and/or validating a user account based on the common representation or privacy-secured token, performing an identification or validation to determine or verify an identity of a subject with which the common representation or privacy-secured token is associated, causing a locking mechanism to unlock or lock, causing a gateway to be opened or closed (e.g., a physical gateway, such as a door, or a digital gateway, such as access to a particular set of computing resources), providing a subject access to a particular computing environment or networking address, initiating financial transactions, providing digital signatures, or any other action as will occur to one of ordinary skill in the art.

Performing an identification or validation process can include the comparison service 127 computing a similarity score between the privacy-secured token and at least one additional privacy-secured token (e.g., or between interoperable, commonly formatted representations generated at step 315, received from one or more computing devices 122, and/or retrieved from the registry 105). In one example, the biometric system 100 can perform the process 300 to generate an interoperable, common-formatted representation from a first biometric representation in a first vendor format and a second biometric representation in a second vendor format. In this example, the comparison service 127 can compare the output interoperable, common-formatted representations by computing a similarity score (e.g., a squared Euclidean distance, $L^2$ norm, cosine similarity metric, etc.). Continuing the example, the comparison service 127 determines that the similarity score satisfies a predetermined threshold and, in response, determines a match between the first biometric representation and the second biometric representation. In at least one embodiment, the biometric system 100 can transmit a positive or negative identification or verification of a subject associated with the capture of step 303.

Exemplary Experimental Results

The following section describes one or more experimental tests, and results thereof, performed on one or more embodiments of systems and methods described herein. The descriptions therein are provided for the purposes of illustrating various elements of the systems and methods (e.g., as observed in the one or more embodiments). All descriptions, embodiments, and the like are exemplary in nature and are not intended to place any limitations on any embodiment described or anticipated herein.

To demonstrate performance of the described systems and processes, a biometric matching experiment was performed using both real and synthetic face images. The real face images were sourced from an operational database of biometric facial data. The synthetic face images were generated from a 3D head model of a specific gender and race (see pg. 12 of Exhibit A). The number of unique subjects, samples per subject and the total number of samples used in experiments are shown in Table 2. For each data source, the number of generated mated and non-mated scores are also reported. "Mated" generally refers an association of two biometric representations that are associated with the same subject, and "non-mated" generally refers to two biometric representations that are not associated with the same subject. A mated score is the result of comparing two mated biometric representations whereas a non-mated score is the result of comparing two non-mated biometric representations. These two sets of scores allow the accuracy of the present system to be measured in terms of an Equal Error Rate (EER) statistic, which is inversely proportional to biometric matching accuracy.

TABLE 2

| Summary of Experiment Samples. | | | | |
|---|---|---|---|---|
| Data source | Real | | Synthetic | |
| Which set | Development | Evaluation | Development | Evaluation |
| Number of unique subjects | 5,001 | 2,730 | 1001 | 985 |
| Total number of samples | 12956 | 7,259 | 3212 | 3,110 |
| Number of samples per subject | 2.6 | 2.7 | 3.2 | 3.2 |

| Data characteristics of the Evaluation set | | Number of samples | |
|---|---|---|---|
| | Is enrollment sample? | Real | Synthetic |
| Gallery | Yes | 2,297 | 958 |
| Probe | No | 433 | 27 |

TABLE 2-continued

| Summary of Experiment Samples. | | | |
|---|---|---|---|
| Probe | Yes | 4529 | 2125 |
| Number of mated scores (in same vendor setting) | | 4,529 | 2,125 |
| Number of non-mated scores (in same vendor setting) | | 11,393,185 | 2,059,491 |

The protocol included preparing two data sets, known as the development and the evaluation set, such that the subjects contained in the development set do not appear in the evaluation set, as described in Table 2. The development set is used to train the neural networks required to estimate the feature-to-feature mapping for each vendor format and to estimate the dimensionality reduction algorithm (e.g., a PCA algorithm) utilized for reducing the dimension of the common format, fixed-size representations. The protocol utilized "arcface" as the common format and tested vendor formats including dlib and a third party deep neural network ("dnn"). The evaluation set is 10 unbiased (e.g., since the trained networks have not seen these subjects) and is used to measure EER under various vendor format parameters. To this end, the samples in the evaluation set are further divided into probe and gallery samples resulting in abundant mated and non-mated scores as reported in Table 2.

For the purpose of the experiment, biometric representation formats "dnn" and "dlib" were utilized as vendor formats and biometric representation format "arcface" was utilized as a common, fixed-size representation format. The dnn and dlib formats demonstrated initial dimensions of 128 bytes and 640 bytes, respectively, and the arcface format demonstrates a dimension of 64 bytes. In at least one embodiment, as demonstrated in FIGS. 4 and 5, there are three possible ways of transforming a vendor-formatted representation (e.g., dnn or dlib) to a common, fixed-size representation (e.g., arcface), which results in the possible permutations shown in Table 2.

TABLE 2

Exemplary Format Transformation Permutations.

| Setting number | Vendor setting | Template | Probe | Cross-vendor comparison? |
|---|---|---|---|---|
| 1 | dlib | dlib | dlib | No |
| 2 | dlib' | dlib' | dlib' | No |
| 3 | dnn | dnn | dnn | No |
| 4 | dnn' | dnn' | dnn' | No |
| 5 | arcface | arcface | arcface | No |
| 6 | dlib' with arcface | dlib' | arcface | Yes |
| | | arcface | dlib' | Yes |
| 7 | dnn' with arcface | dnn' | arcface | Yes |
| | | arcface | dnn' | Yes |
| 8 | dnn' with dlib' | dlib' | dnn' | Yes |
| | | dnn' | dlib' | Yes |

In an instance of two vendors attempting to map to the reduced arcface FXR, there are 11 possible combinations (e.g., depending on which representation is used as a template and which is used as a probe). The "prime" notation used in Table 2 and elsewhere in the present disclosure, dnn' or dlib' means dnn-derived arcface representation or dlib-derived arcface representation whereas dnn or dlib (e.g., without prime) indicates the vendor's original representation.

The protocol called for elimination of symmetrical permutations, thereby simplifying the experimental analysis to eight possible settings when the template and probe "symmetries" are discounted. As used herein, permutation generally refers to instances where comparing a first format to a second format is equivalent to comparing the second format to the first format. For example, in the context of the present experiment, comparing dlib' with arcface or comparing arcface with dlib' is equivalent and, therefore, the permutations are symmetrical. A symmetric matcher demonstrates permutation symmetry, for example, when a Euclidean distance-based comparison A to B is the same as a Euclidean distance-based comparison B to A. In the present experiment, EER values for the same setting demonstrated a correlation of 0.985, which may reflect natural variation present in the EER estimate.

Figure 4:
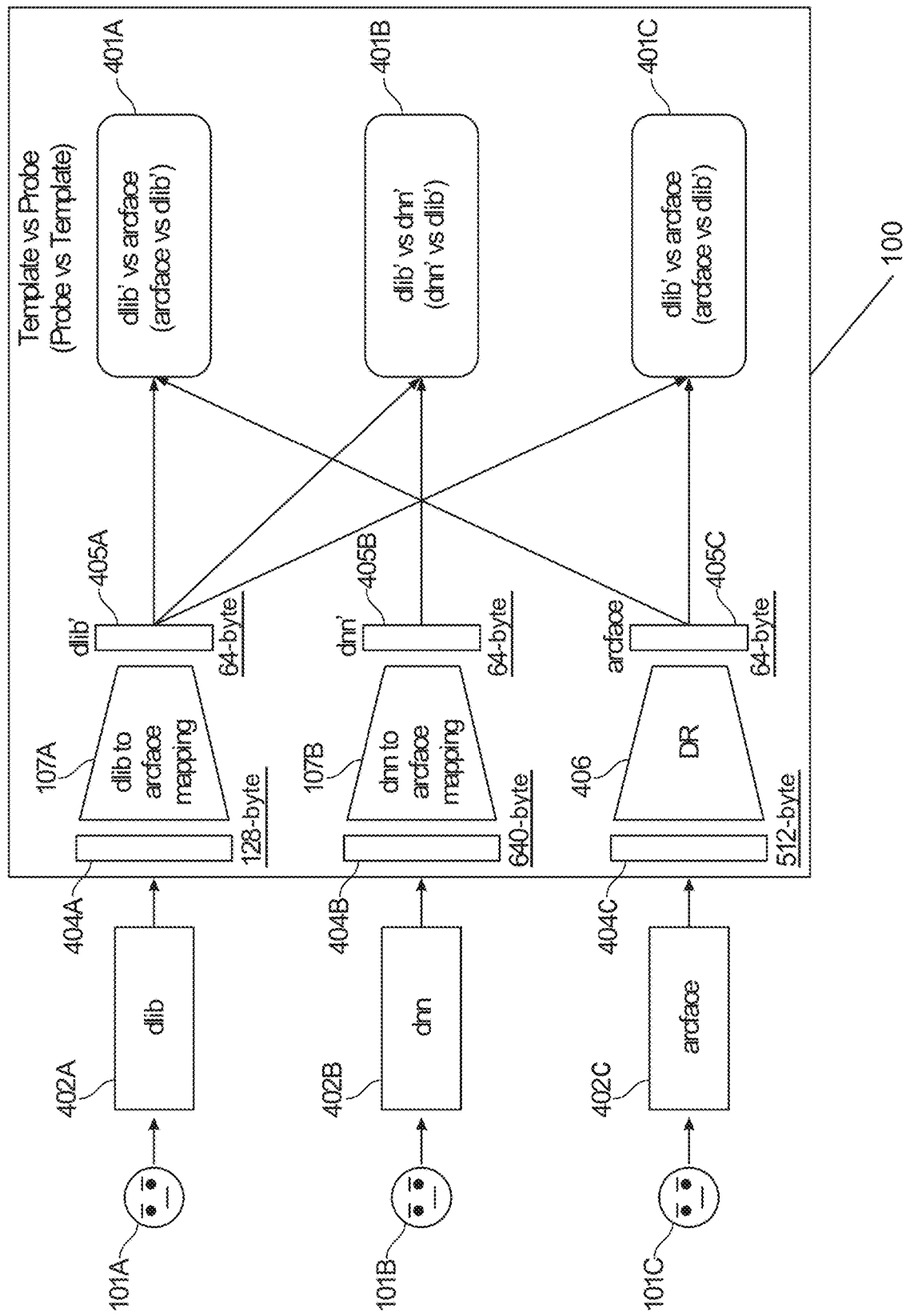
FIGS. 4 and 5 show exemplary comparison permutations, according to one embodiment of the present disclosure.
Figure 5:
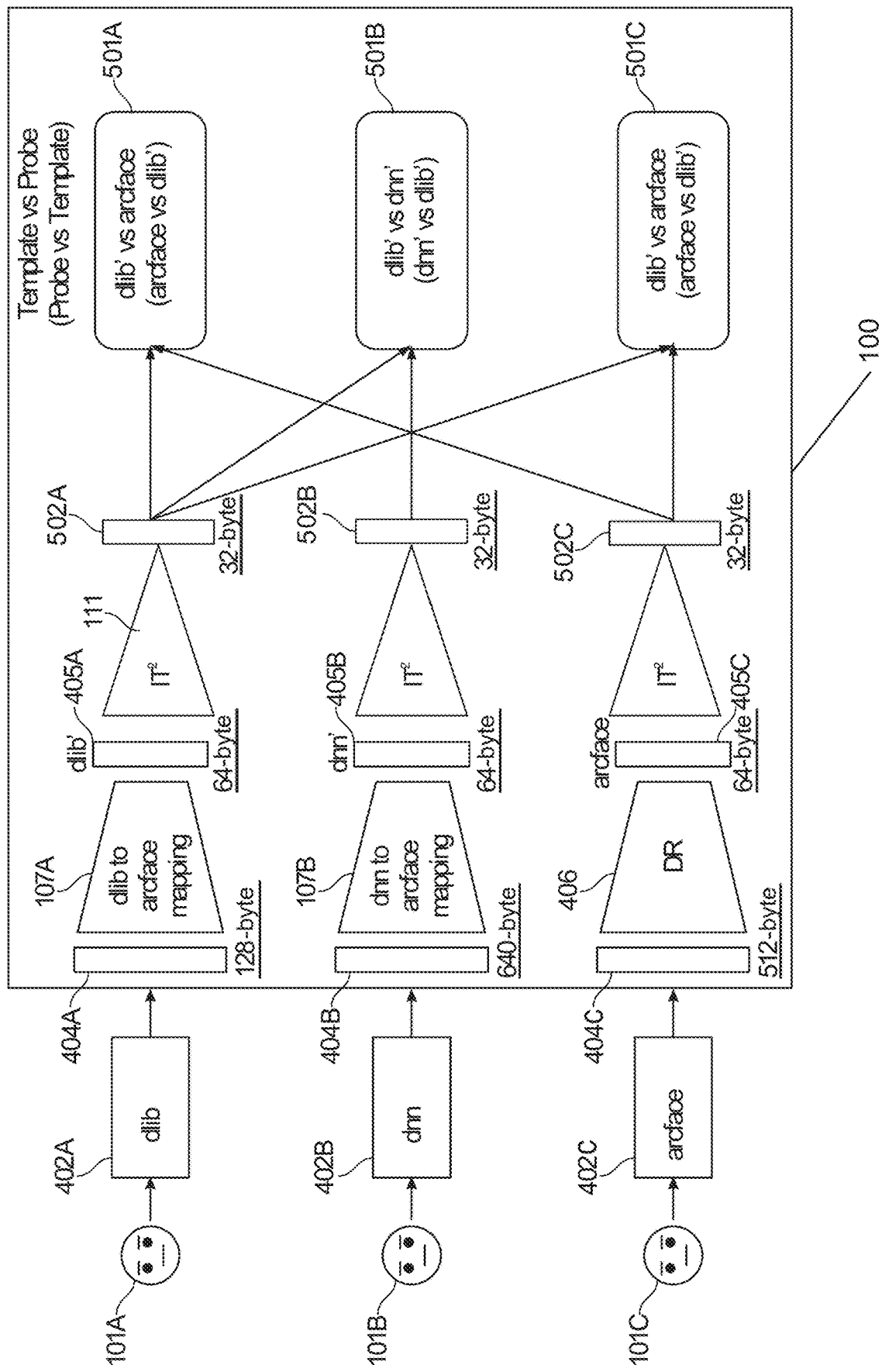

By simplifying the protocol on permutation symmetry, the experimental analysis was refined to three permutations (e.g., three cross-vendor comparisons) as shown in FIGS. 4 and 5. According to one embodiment, dlib' with dnn' is the significant comparison because in this scenario, the fixed-size representations of these two vendors were not designed to interoperate and, thus, are only rendered interoperable by the present systems and processes.

FIG. 4 shows exemplary comparison permutations 401A-C (e.g., as performed using fixed-size representations). In various embodiments, FIG. 4 includes identical subjects 101A-C. In at least one embodiment, a first capture environment 402A of a first vendor generates a first-format biometric representation 404A of the subject 101A. In one or more embodiments, a second capture environment 402B of a second vendor generates a second-format biometric representation 404B of the subject 101B. In various embodiments, a third capture environment 402C generates a third-format biometric representation 404C of the subject 101C. The first format can include dlib, the second format can include a proprietary deep neural network (dnn), and the third format can include arcface. In various embodiments, the biometric system 100 transforms the first-format biometric representation 404A and the second format biometric representation 404B into the third format and performs dimensionality reduction on the third-format biometric representation 404C, thereby providing interoperable representations of the subjects 101A-C that may be compared for purposes of identification and verification (e.g., among additional suitable purposes).

In various embodiments, the biometric system 100 (e.g., the transformation service 125 thereof, not shown in FIG. 4) applies a first F2F mapping function 107A to the first-format representation 404A to generate a third-format representation 405A (e.g., the transformation service maps the representation from a 128-byte dlib format to a 64-byte arcface format). In one or more embodiments, the biometric system 100 applies a second F2F mapping function 107B to the second-format representation 404B to generate a third-format representation 405B (e.g., the transformation service maps the representation from a 640-byte dnn format to the 64-byte arcface format). In at least one embodiment, the biometric system 100 applies a dimensionality reduction to the third-format representation 404C to generate a dimension-reduced, third-format representation 405C (e.g., transformation service compresses the representation from 512 bytes to 64 bytes). In one or more embodiments, the biometric system 100 can compare the third-format representations 405A-C, thereby providing an interoperable solution for identifying and verifying the subjects 101A-C. For example, in the permutation 401A, the biometric system 100 can provide interoperability between the dlib and arcface formats by comparing the third format representations 405A, 405C. In another example, in the permutation 401B, the biometric system 100 can provide interoperability between the dlib and dnn formats by comparing the third format representations 405A, 405B. In another example, in the permutation 401C, the biometric system 100 can provide interoperability between the dnn and arcface formats by comparing the third format representations 405B, 405C.

FIG. 5 shows exemplary comparison permutations 501A-C in which the biometric system 100, via the tokenization service 111, further transforms the third-format representations 405A-C of dimension 64 bytes into irreversible, privacy-secured tokens 502A-C of dimension 32 bytes. Permutations 501A-C demonstrate that comparisons can be performed in the reduced, common arcface domain (e.g., as in FIG. 4) or a lossy-transformed, privacy-secured domain. For example, in the permutation 501A, the biometric system 100 can provide interoperability between the dlib and arcface formats by comparing the tokens 502A, 502C. In another example, in the permutation 501B, the biometric system 100 can provide interoperability between the dlib and dnn formats by comparing the tokens 502A, 502B. In another example, in the permutation 501C, the biometric system 100 can provide interoperability between the dnn and arcface formats by comparing the tokens 502B, 502C.

According to one embodiment, when performed in the lossy-transformed, privacy-secured domain, any suitable size may be used. For example, the biometric system 100 can generate tokens of dimension 32 bytes or dimension 48 bytes, both of which are still smaller than 64 bytes, which is the length of the fixed-size representations before tokenization. In this example, by providing a tokenization size less than a size of the source representation, the biometric system 100 may generate more compact representation of the subjects 101A-C that can be compared at greater speed and scale versus larger sized representations.

Figure 6:
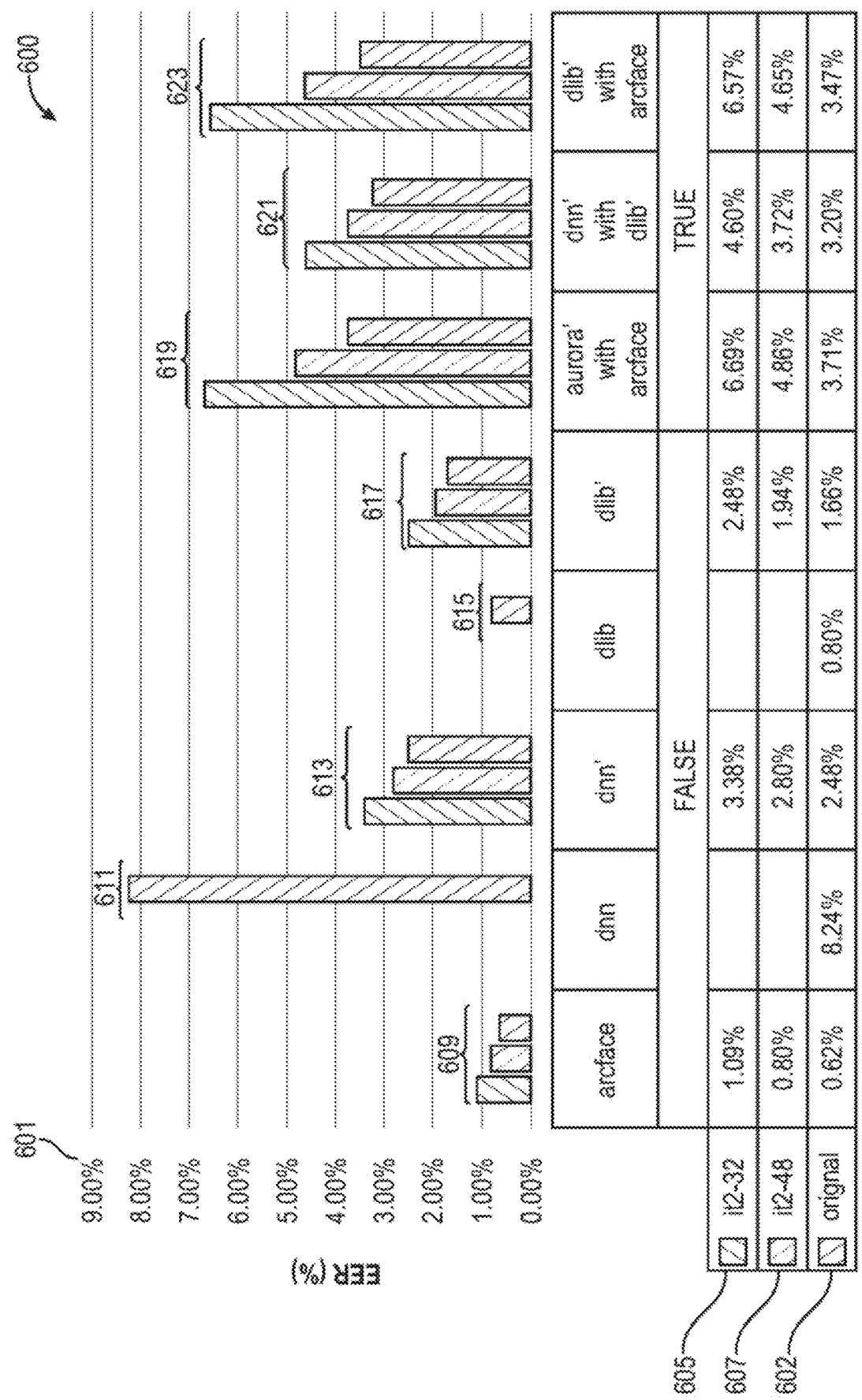
FIG. 6 shows a chart of exemplary biometric matching performance under various parameters, according to one embodiment of the present disclosure.

FIG. 6 shows a chart 600 that describes exemplary biometric matching performance under various parameters. Biometric matching performance can be approximated as a value of equal error rate (EER) 601. As used herein, EER generally refers to an operating point at which false rejection rate (FRR) is equal to false acceptance rate (FAR) (e.g., an empirical estimate of the probability that representations of two differently named strings are classified as the same). Generally, a lower EER percentage corresponds to greater biometric matching accuracy. In one or more embodiments, the EER values show in the chart 600 are derived (e.g., averaged) from real data evaluation sets and synthetic data evaluation sets. A real data evaluation set can refer to data (e.g., biometric representations) derived from live subjects (e.g., such as real face images). A synthetic data evaluation set can refer to data associated derived from artificial sources, such as, for example, computer-generated face images. In one example, biometric matching is performed using a real data evaluation set to generate real data EER values, and biometric matching is performed using a synthetic data evaluation set to generate synthetic data EER values. In the same example, the EER values shown in the chart 600 are generated by averaging corresponding real data and synthetic data EER values.

The various parameters include fixed-size representation 602, tokenized representation 607, and tokenized representation 607. The fixed sized representation 602 refers to samples that were not subjected to lossy transformation processes. The tokenized representation 605 refers to samples subjected to lossy transformation processes such that a size of the tokenized-representation is 48 bytes. The tokenized representation 607 refers to samples subjected to lossy transformation processes such that a size of the tokenized-representation is 32 bytes.

The results of experimental comparisons include permutations 609, 611, 613, 615, 617, 619, 621, and 623. Permutation 609 compares arcface-formatted samples to arcface-formatted samples, permutation 611 compares dnn-formatted samples to dnn-formatted samples, permutation 613 compares dnn'-formatted samples to dnn'-formatted samples, permutation 615 compares dlib-formatted samples to dlib-formatted samples, permutation 617 compares dlib'-formatted samples to dlib'-formatted samples, permutation 619 compares dnn'-formatted samples to arcface-formatted samples, permutation 621 compares dnn'-formatted samples to dlib'-formatted samples, and permutation 623 compares dlib' formatted samples to arcface-formatted samples.

The tokenized representations 607 of the permutation 609 represent the lower bound of EER 6001, i.e., 0.62%. Based on permutations 609, 611, and 613, both dnn- and dlib-based representations are inferior in accuracy to arcface. Unexpectedly, permutations 611, 613, 619 demonstrate that dnn' (the dnn-converted arcface in the reduced 64 dimensions) improves over its original representation. In comparison, permutations 615 and 617 demonstrate that the EER 601 from dlib to dlib' shows a slight degradation, which may be expected since the optimal representation of a biometric sample is likely to be the vendor's own format (dlib) as opposed to the translated one (dlib').

In the cross-vendor settings represented by permutations 619, 621, and 623, the corresponding EER 601 values are comparable. Chart 600 demonstrates that, while all the EER 601 values are generally higher than their constituent single-vendor settings (of either vendor), the dnn' with dlib' settings of permutations 621 appears to be better in terms of EER in across parameters for original representation 602, tokenized representation 605, and tokenized representation 607. For example, in permutation 621, comparisons of dlib-converted 48-byte tokens to dnn-converted 48-byte tokens demonstrates an EER 601 of 3.62%. In this example, permutation 621 demonstrates that the present technology provides for sufficiently accurate interoperable biometric comparisons for vendors that, prior to novel discoveries described herein, were incapable of performing cross-vendor comparison.

Figure 7:
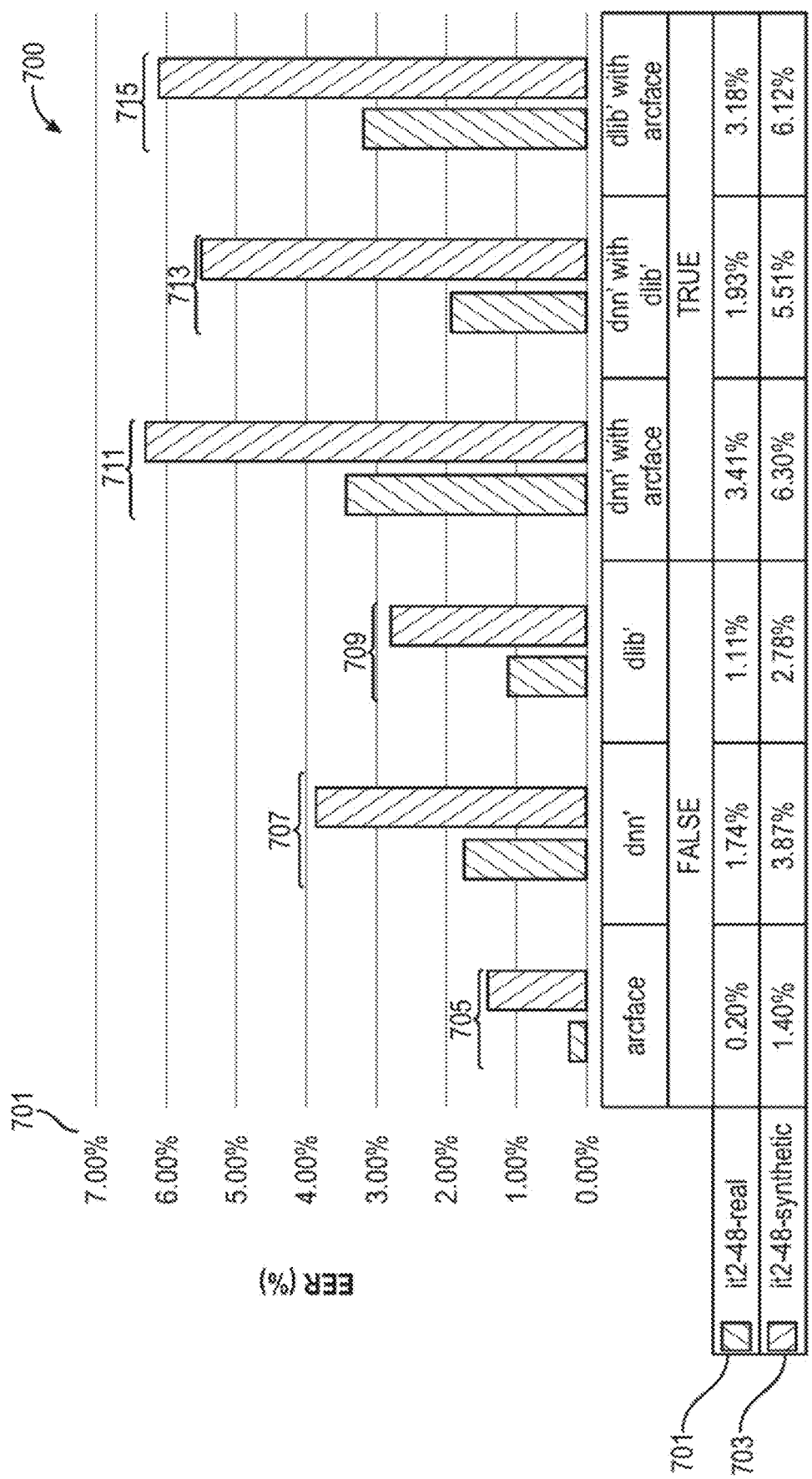
FIG. 7 shows a chart of exemplary biometric matching performance under various settings, according to one embodiment of the present disclosure.

FIG. 7 shows a chart 700 that describes exemplary biometric matching performance under various settings, whereby the EER values due to the real or synthetic face images are reported separately. In at least one embodiment, the chart 700 demonstrates that privacy-preserved, interoperable fixed-size representation templates are achievable by the present systems and methods. Biometric matching performance can be approximated as a value of equal error rate (EER) 701. The various parameters include real data 701, synthetic data 703, and experimental results represented by permutations 705, 707, 709, 711, 713, and 715. Real data 701 can refer to biometric representations generated from biometric data of real human subjects. Synthetic data 703 can refer to biometric representations sourced from artificially generated biometric data (e.g., see page 12 of Exhibit A).

Permutation 705 compares arcface-formatted samples to arcface-formatted $(IT)^2$ tokens, permutation 707 compares dnn'-formatted (IT) 2 tokens to dnn'-formatted $(IT)^2$ tokens, permutation 709 compares dlib'-formatted (IT) 2 tokens to dlib'-formatted $(IT)^2$ tokens, permutation 711 compares dnn'-formatted (IT) 2 tokens to arcface-formatted $(IT)^2$ tokens, permutation 713 compares dnn'-formatted (IT) 2 tokens to dlib'-formatted $(IT)^2$ tokens, and permutation 715 compares dlib' formatted (IT) 2 tokens to arcface-formatted $(IT)^2$ tokens.

The permutations 705-715 demonstrate that the synthetic data 703 give rise to higher values of EER 601 (e.g., lower accuracy). The significantly higher EER 701 for the synthetic data 703 could be due to the inclusion of diverse and challenging settings, such as, for example, backlighting. Although backlighting contains only a small fraction of the data (less than 10%), it can disproportionately increase the EER 701 values (e.g., particularly for people with darker skin tones). In particular, permutation 713 demonstrates that the comparison between dnn-converted IT2 token with dlib-converted IT2 token yields an EER 701 of 1.93% when real data 701 are used and yields an EER 701 of 5.51% when synthetic data 703 are used.

In one or more embodiments, the chart 700 demonstrates that the present systems and processes for cross-vendor interoperability support sufficiently accurate biometric comparisons. For example, permutation 713 demonstrates that cross-vendor comparisons performed on 48-byte, real data-derived tokens achieve EER 701 values of 1.9%. Compared to EER values 801 of the non-cross-vendor comparisons represented by permutations 707 and 709, the cross-vendor comparison does not suffer from significant reductions in matching performance.

Figure 8:
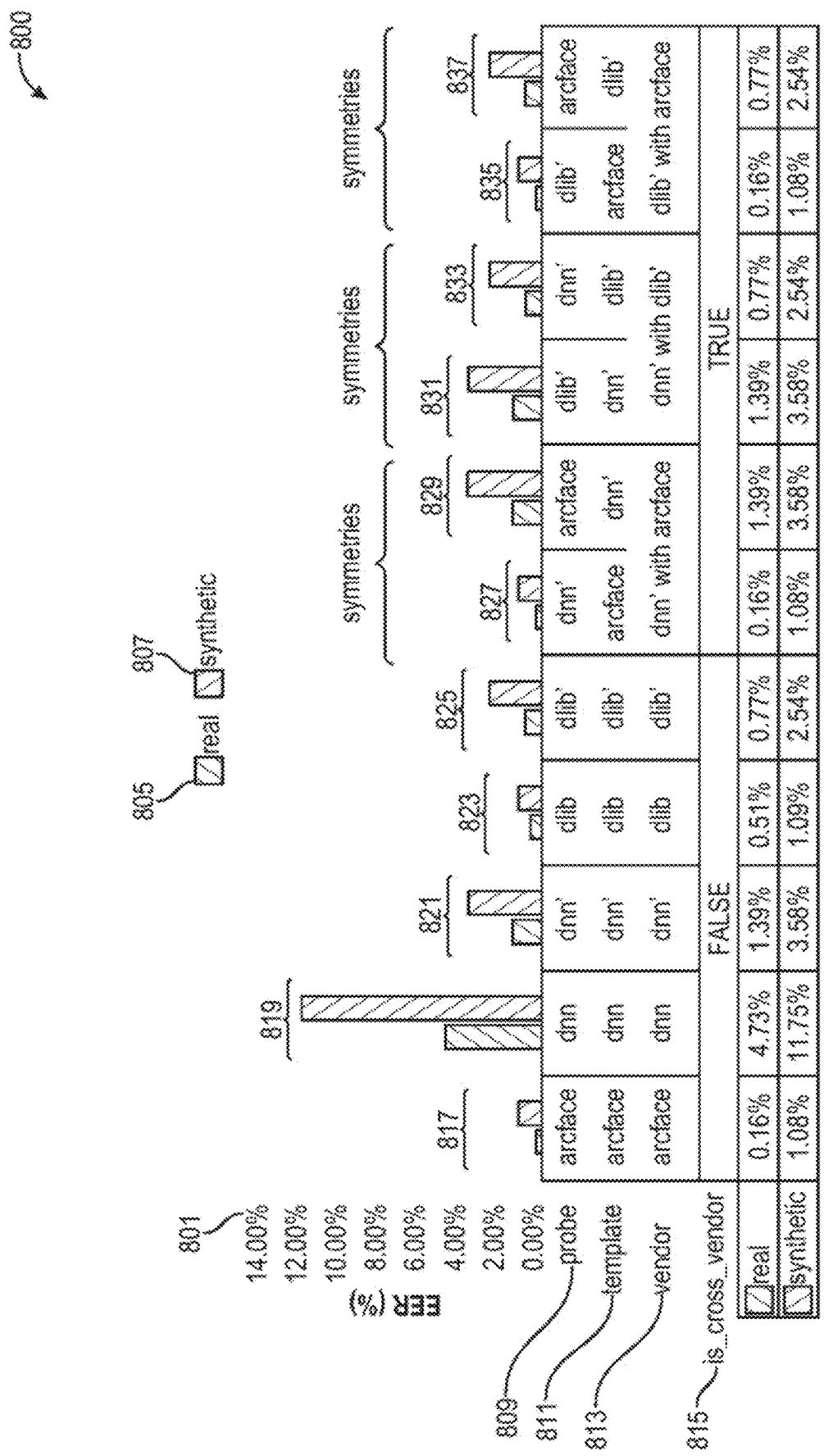
FIG. 8 shows a chart of exemplary biometric matching performance under various parameters, according to one embodiment of the present disclosure.

FIG. 8 shows a chart 800 that describes exemplary biometric matching performance under various parameters. Biometric matching performance can be approximated as a value of equal error rate (EER) 801. According to one embodiment, the parameters include real data 805, synthetic data 807, probe formats 809, template formats 811, and vendor formats 813. Real biometric data 805 can refer to biometric representations generated from biometric data of real human subjects. Synthetic data 807 can refer to biometric representations that sourced from artificially generated biometric data. Probe format 809 can refer to a format of a probe biometric. The probe biometric generally refers to a biometric representation that the system compares to a stored representation (e.g., a biometric template).

Exemplary probe formats 809 include arcface, dnn, dnn', dlib, and dlib'. According to one embodiment, probe formats dnn' and dlib' refer to biometric representations that were transformed from the dlib format to the dnn format by an embodiment of the disclosed systems and processes (e.g., see, for example, FIGS. 1A-B and 3 and accompanying description). Template format 811 can refer to a format of a template biometric representation and can include arcface, dnn, dnn', dlib, and dlib'. Vendor format 813 refers to a combination of probe format 809 and template format 811 included during biometric matching processes from which EER 801 values are generated.

In various embodiments, the chart 800 demonstrates the sufficient accuracy of the present systems and methods, for example, because the arcface-derived, cross-vendor formats represented by permutations 827, 829, 831, 833, 835, and 837 demonstrate a lower bound EER 801 value of about 0.77% and an upper bound EER 801 value of about 1.08%. In one or more embodiments, the miniscule values of EER 801 in the cross-vendor permutations show that the present systems and processes achieve highly accurate biometric matching while providing for interoperability between vendors.

Figure 9:
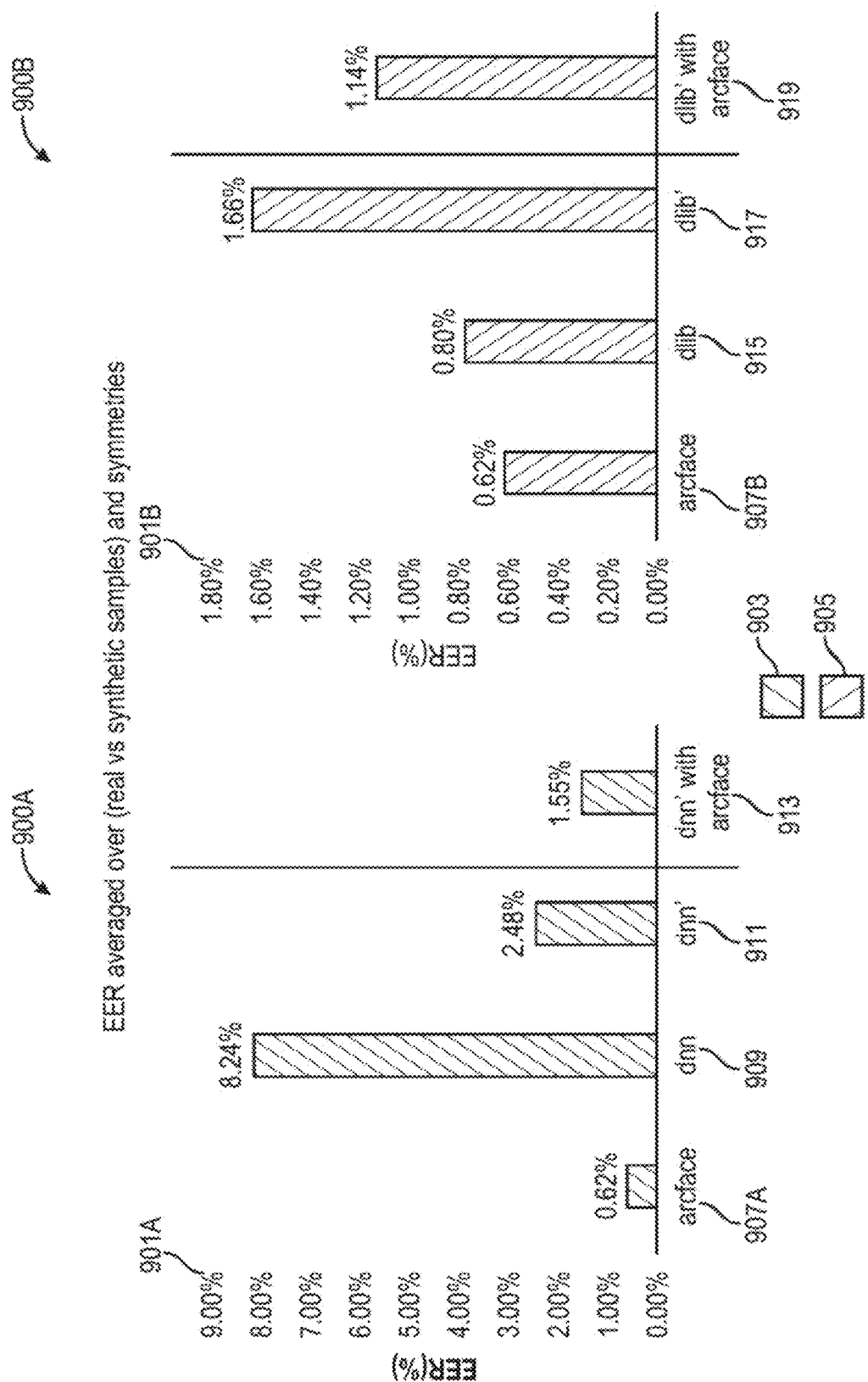
FIG. 9 shows charts of exemplary biometric matching performance under various parameters, according to one embodiment of the present disclosure.

FIG. 9 shows exemplary charts 900A, 900B that describes exemplary biometric matching performance EER 901A, 901B under various parameters. The parameters can include real data 903, synthetic data 905, arcface format 907A, 907B, dnn format 909, dnn' format 911, dnn' with arcface format 913, dlib format 915, dlib' format 917, and dlib' with arcface format 919. In various embodiments, the charts 900A, 900B show that comparison processes performed on real data 903-derived representations generally demonstrate greater values of EER 901 as compared to equivalent processes performed on synthetic data 905-derived representations. In at least one embodiment, the chart 900 demonstrates that translating vendor-formatted representations to a common format can provide a level of biometric matching accuracy in excess of a biometric matching accuracy that could be achieved when the vendor format is used.

Figure 10:
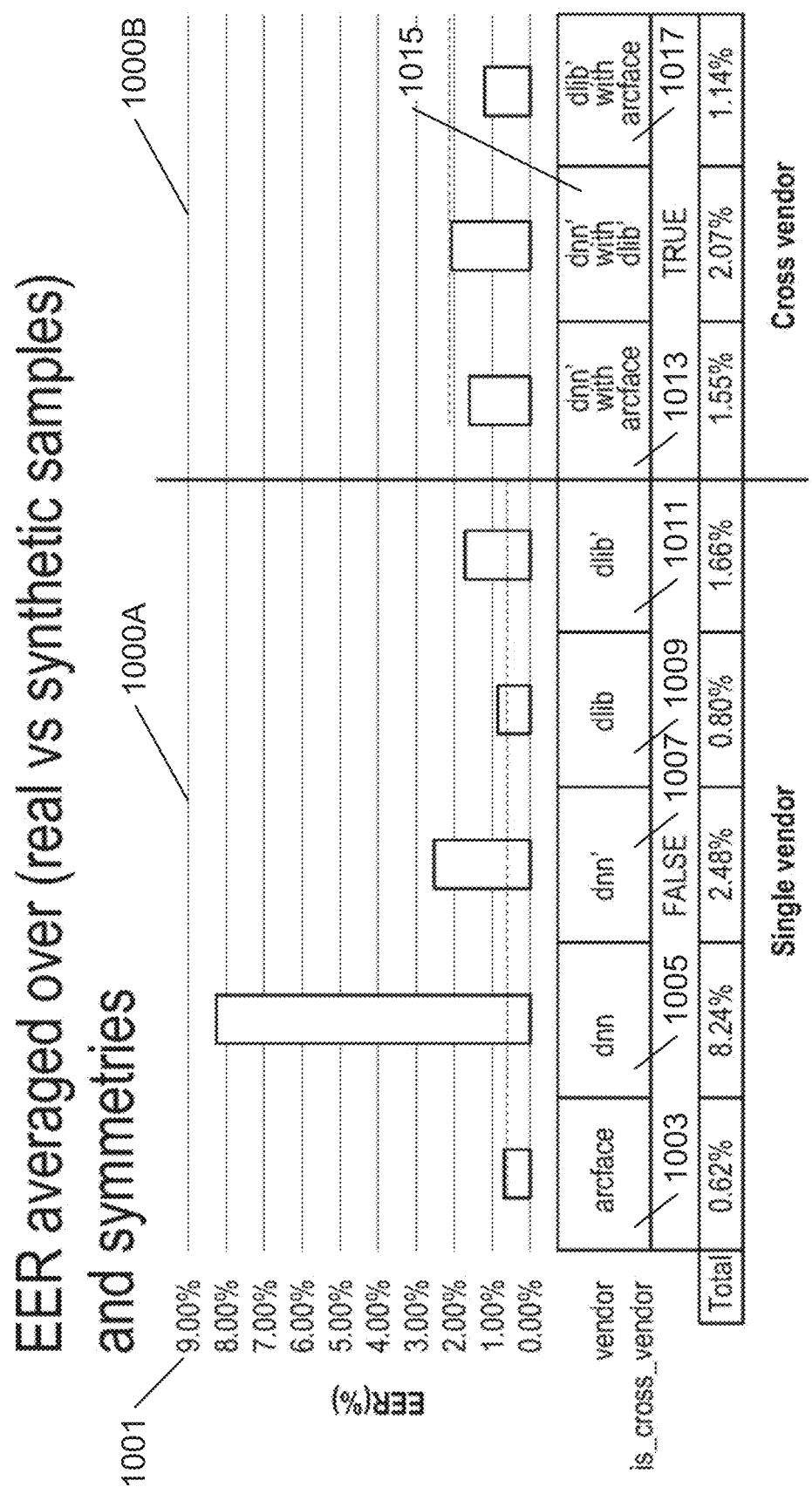
FIG. 10 shows charts of exemplary biometric matching performance under various settings, according to one embodiment of the present disclosure.

FIG. 10 shows exemplary charts 1000A, 1000B that describes exemplary biometric matching performance EER 1001 for interoperable capture and matching processes performed under various parameters on a dataset of real biometric samples and a dataset of synthetic biometric samples. According to one embodiment, the chart 1000A shows baseline performance data for non-interoperable biometric matching processes performed on sets of biometric representations with a shared original format (e.g., representations generated via the same vendor). In one or more embodiments, the chart 1000B shows experimental performance data for interoperable biometric matching processes performed on transformed representations of differently formatted biometric representations (e.g., chart 1000A shows single vendor comparison and chart 1000B shows cross-vendor, interoperable comparison). According to one embodiment, the values of EER 1001 for the chart 1000B are averaged EER values from separate biometric matching processes performed on a dataset of real biometric samples and a dataset of synthetic biometric samples.

The parameters can include arcface format 1003, dnn format 1005, dnn' format 1007, dlib format 1007, dlib' format 1009, dnn' with arcface format 1013, dnn' with dlib' format 1015, and dlib' with arcface format 1017. As one example, dlib' can indicate dlib-formatted representations that were transformed as described herein to arcface-formatted representations and that were matched against other dlib'-formatted representations. Continuing the example, dlib' with arcface can indicate dlib'-formatted representations that were matched against mated and non-mated representations in an original arcface format. In at least one embodiment, the charts 1000A, 1000B demonstrate that the present processes for translating vendor-formatted representations (e.g., dnn, dlib) to a common format (e.g., arcface) can provide a level of biometric matching accuracy comparable to or in excess of levels of biometric matching accuracy that may be achieved when biometric matching is performed in the original vendor format.

Figure 11:
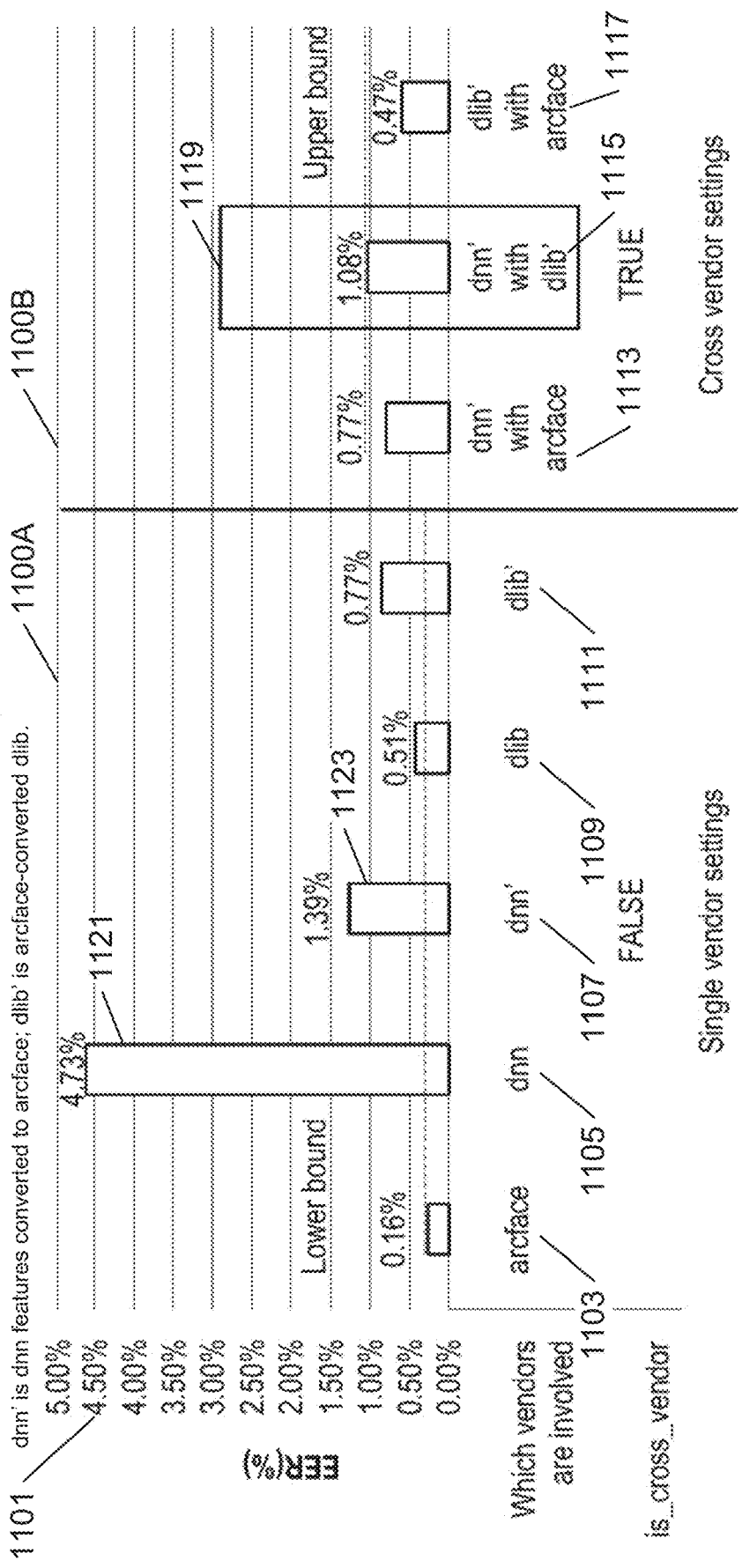
FIG. 11 shows charts of exemplary biometric matching performance under various settings, according to one embodiment of the present disclosure.

FIG. 11 shows charts 1100A, 1100B that describe exemplary biometric matching performance EER 1101 for interoperable capture and matching processes performed under various parameters on a dataset of real biometric samples. According to one embodiment, the chart 1100A shows baseline performance data for non-interoperable biometric matching processes performed on sets of biometric representations with a shared original format (e.g., representations generated via the same vendor). In one or more embodiments, the chart 1100B shows experimental performance data for interoperable biometric matching processes performed on transformed representations of differently formatted biometric representations (e.g., chart 1100A shows single vendor comparison and chart 1100B shows cross-vendor, interoperable comparison).

The parameters can include arcface format 1103, dnn format 1105, dnn' format 1107, dlib format 1109, dlib' format 1111, dnn' with arcface format 1113, dnn' with dlib' format 1115, and dlib' with arcface format 1117. As one example, dlib' can indicate dlib-formatted representations that were transformed as described herein to arcface-formatted representations and that were matched against other dlib'-formatted representations. Continuing the example, dlib' with arcface can indicate dlib'-formatted representations that were matched against mated and non-mated representations in an original arcface format. In at least one embodiment, the charts 1100A, 1100B demonstrate that the present systems and processes for translating vendor-formatted representations (e.g., dnn, dlib) to a common format (e.g., arcface) can provide a level of biometric matching accuracy comparable to or in excess of levels of biometric matching accuracy that may be achieved when biometric matching is performed in the original vendor format. In at least one embodiment, a matching performance result 1119 associated with the dnn' with dlib' format 1115 is superior to matching performance results 1121, 1123 associated with dnn format 1105 and dnn' format 1107, respectively. According to one embodiment, the superior matching performance result 1119 indicates that the present systems and processes for cross-vendor interoperability can demonstrate superior biometric matching performance as compared to traditional, single-vendor biometric matching systems and processes.

Additional Description of Exemplary Embodiments

Figure 12:
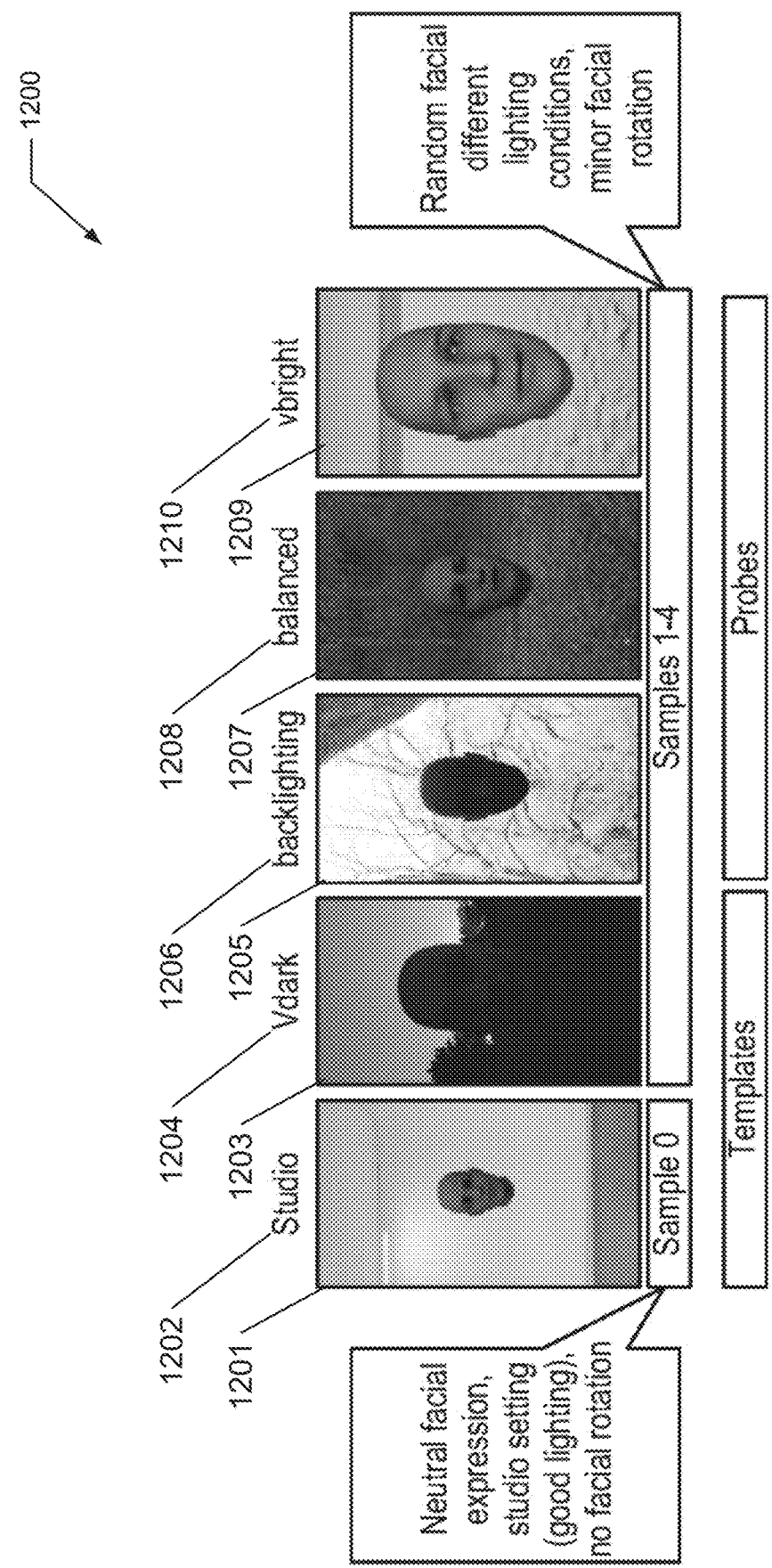
FIG. 12 shows exemplary synthetic data that may be generated via the present biometric systems and processes, according to one embodiment of the present disclosure.

FIG. 12 shows exemplary synthetic data 1200 that may be generated via the present biometric systems and processes. In various embodiments, the representation service 123 (e.g., shown in FIG. 1B and described herein) can generate synthetic data, such as, for example, synthetic facial images 1201, 1203, 1205, 1207, 1209. In one or more embodiments, the representation service 123 can generate each synthetic facial image 1201, 1203, 1205, 1207, 1209 according to one or more optimal or non-optimal conditions, as described herein. In at least one embodiment, the representation service 123 generates the facial image 1201 according to a studio condition 1202, the facial image 1203 according to an underlit condition 1204, the facial image 1205 according to an adverse backlight condition 1206, the facial image 1207 according to a balanced lighting condition, and the facial image 1209 according to an overlit condition 1210. The studio condition 1202 can include optimal parameters, such as, for example, neutral expression, lack of biometric feature rotation, direct frontal perspective of the biometric feature, optimal distance of the biometric feature to a simulated camera, and optimal lighting. The underlit condition 1204 can include the biometric feature poorly lit (e.g., rendering the feature less distinguishable against a background environment). The adverse backlight condition 1206 can include high levels of background lighting such that the biometric feature of the foreground is poorly resolved. The balanced lighting condition 1208 can include the biometric feature sufficiently illuminated so as to be clearly resolved and differentiable from a background and/or foreground environment. The overlit condition 1210 can include the biometric feature illuminated by natural lighting (e.g., simulated sunlight) or high intensity artificial light (e.g., incandescent light, fluorescent light, LED light, etc.). Additional non-optimal conditions that may be demonstrated by the facial images 1203, 1205, 1207, 1209 include, but are not limited to, mismatched facial expression (e.g., as compared to a facial expression of a template facial image), facial rotation, and partially obscured facial.

In some embodiments, when used to train F2F mapping functions via biometric matching, the transformation service 125 (see FIG. 1B) uses the facial image 1201 of the studio quality 1202 (e.g., an optimal condition) as a template representation to which probe representations are compared (e.g., the probe representations being derived from non-optimal condition images, such as the facial images 1203, 1205, 1207, 1209. In at least one embodiment, by performing training using optimal and non-optimal condition biometric data, the transformation service 125 generates F2F mapping functions that are robust and tolerant to biometric inputs of varying quality (e.g., mated outputs and non-mated outputs of the trained F2F mapping function may be matched and mismatched with sufficient accuracy).

Aspects, features, and benefits of the systems, methods, processes, formulations, apparatuses, and products discussed herein will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A process, comprising:
receiving a biometric representation in a first format;
determining a dimension parameter based on the biometric representation, wherein the dimension parameter does not exceed a dimension of the biometric representation;
generating a common biometric representation in a second format by applying a feature-to-feature mapping function to the biometric representation, wherein the feature-to-feature mapping function is based on the dimension parameter and comprises a deep neural network;
training the deep neural network on a training dataset comprising a plurality of mated and non-mated biometric images associated with a plurality of human subjects; and
applying a lossy transformation to the common biometric representation to generate a token.

2. The process of claim 1, wherein a vector dimension of the token is less than the dimension parameter.

3. A process, comprising:
receiving a biometric representation in a first format;
determining a dimension parameter based on the biometric representation, wherein the dimension parameter does not exceed a dimension of the biometric representation;
generating a common biometric representation in a second format by applying a feature-to-feature mapping function to the biometric representation, wherein the feature-to-feature mapping function is based on the dimension parameter and comprises a deep neural network;
generating a training dataset comprising a plurality of mated and non-mated synthetic biometric images, wherein the training dataset excludes biometric data associated with real human subjects; and
training the deep neural network on the training dataset.

4. The process of claim 3, wherein sets of mated biometric images of the training dataset each comprise at least one biometric image associated with an optimal condition and at least one biometric image associated with a non-optimal condition.

5. The process of claim 4, wherein the non-optimal condition is an underlit lighting condition.

6. The process of claim 4, wherein the non-optimal condition is an adverse backlight condition.

7. The process of claim 4, wherein the non-optimal condition is an overlit lighting condition.

8. The process of claim 4, wherein the non-optimal condition is a rotation condition.

9. The process of claim 4, wherein:
the plurality of mated and non-mated synthetic biometric images comprise facial images;
the optimal condition is a first facial expression; and
the non-optimal condition is a second facial expression different from the first facial expression.

10. The process of claim 3, further comprising applying a lossy transformation to the common biometric representation to generate a token.

11. The process of claim 10, wherein a vector dimension of the token is less than the dimension parameter.

12. A system, comprising:
at least one processor in communication with at least one data store;
the at least one data store comprising:
a feature-to-feature mapping function that, when applied, transforms biometric representations from a first format to a common format; and
a dimensionality reduction function that, when applied, reduces a dimension of biometric representations in the common format to a dimension parameter;
a non-transitory, machine-readable memory device comprising instructions stored thereon that, when executed by the at least one processor, cause the at least one processor to:
obtain a first biometric representation in the first format;
obtain a second biometric representation in the common format, wherein the first biometric representation is associated with a first subject and the second biometric representation is associated with a second subject;
determine the dimension parameter for the common format based on the first biometric representation and the second biometric representation, wherein the dimension parameter does not exceed a vector size of the first biometric representation or the second biometric representation;
apply the feature-to-feature mapping function to the first biometric representation to generate a first common biometric representation;
apply the dimensionality reduction function to the second biometric representation to generate a second common biometric representation, wherein the first common biometric representation and the second common biometric representation are of a second vector size equal to the dimension parameter;
compare the first common biometric representation to the second common biometric representation;
based on the comparison, determine that the first common biometric representation is within a similarity threshold of the second common biometric representation; and
transmit, to a computing device, a positive verification of a match between the first subject and the second subject.

13. The system of claim 12, wherein:
the feature-to-feature mapping function comprises a deep neural network; and
the instructions, when executed by the at least one processor, further cause the at least one processor to train the deep neural network on a first training dataset comprising a plurality of mated and non-mated biometric representations associated with human subjects.

14. The system of claim 13, wherein the instructions, when executed by the at least one processor, further cause the at least one processor to:

generate a second training dataset comprising a plurality of mated and non-mated synthetic biometric representations; and train the deep neural network on the second training dataset.

15. The system of claim 14, wherein the instructions, when executed by the at least one processor, further cause the at least one processor to:

generate a third training dataset comprising at least a portion of the first training dataset and the second training dataset; and train the deep neural network on the third training dataset.

16. A non-transitory, computer-readable medium comprising instructions that, when executed by a computer, cause the computer to:

obtain a first common biometric representation of a first length and in a first format;

obtain a second biometric representation of a second length and in a second format, wherein the first length exceeds the second length;

apply a feature-to-feature mapping function to the second biometric representation to transform the second biometric representation into a second common biometric representation in the first format, wherein the second common biometric representation comprises a third length less than the first length and the second length; and apply a dimensionality reduction function to the first common biometric representation to reduce the first common biometric representation from the first length to the third length.

17. The non-transitory, computer-readable medium of claim 16, wherein the instructions, when executed by the computer, cause the computer to apply a lossy transformation to each of the first common biometric representation and the second common biometric representation to generate a first token and a second token.

18. The non-transitory, computer-readable medium of claim 17, wherein the instructions, when executed by the computer, cause the computer to positively verify an identity of a subject associated with the second biometric representation based on a comparison between the first token and the second token.

* * * * *